(12) United States Patent
Hlatky et al.

(10) Patent No.: US 11,019,248 B2
(45) Date of Patent: *May 25, 2021

(54) ADAPTIVE TRAIL CAMERAS

(71) Applicants: Joseph F Hlatky, Reisterstown, MD (US); Steven D Thomas, Jr., Valleyford, WA (US)

(72) Inventors: Joseph F Hlatky, Reisterstown, MD (US); Steven D Thomas, Jr., Valleyford, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,367

(22) Filed: Dec. 22, 2019

(65) Prior Publication Data

US 2020/0186699 A1 Jun. 11, 2020

Related U.S. Application Data

(63) Continuation of application No. 15/836,845, filed on Dec. 9, 2017, now Pat. No. 10,560,622, which is a continuation of application No. 14/588,924, filed on Jan. 3, 2015, now Pat. No. 9,871,959.

(60) Provisional application No. 61/926,305, filed on Jan. 11, 2014, provisional application No. 62/006,237, filed on Jun. 1, 2014.

(51) Int. Cl.
*H04N 5/232* (2006.01)

(52) U.S. Cl.
CPC ......... *H04N 5/23206* (2013.01); *H04N 5/232* (2013.01); *H04N 5/23216* (2013.01); *H04N 5/23245* (2013.01)

(58) Field of Classification Search
None
See application file for complete search history.

(56) References Cited

U.S. PATENT DOCUMENTS

| | | | | |
|---|---|---|---|---|
| 7,471,334 | B1 * | 12/2008 | Stenger | H04N 5/2351 348/373 |
| 9,044,770 | B1 * | 6/2015 | Eyring | B05B 12/12 |
| 2010/0097471 | A1 * | 4/2010 | Drive | G08B 13/19669 348/159 |
| 2010/0302093 | A1 * | 12/2010 | Bunch | G01S 13/953 342/26 B |
| 2012/0112667 | A1 * | 5/2012 | Mohan | H05B 47/16 315/307 |
| 2012/0327225 | A1 * | 12/2012 | Barley | H04N 7/188 348/143 |
| 2014/0007019 | A1 * | 1/2014 | Saukko | G06F 3/0484 715/863 |
| 2014/0184852 | A1 * | 7/2014 | Niemi | H04N 5/2356 348/239 |
| 2014/0333468 | A1 * | 11/2014 | Zhu | G01S 17/95 342/54 |

(Continued)

*Primary Examiner* — Edemio Navas, Jr.

(57) ABSTRACT

Example techniques are disclosed for altering trail camera settings when deployed. For example, settings relating to triggering functionality, time lapse functionality, image resolution, motion sensor sensitivity, flash intensity, and other camera functions can be altered. The settings can be altered based on environmental conditions such as weather and ambient noise. The settings can also be altered based on trail camera conditions such as available battery capacity or image storage capacity. The trail camera settings can also be altered based on images obtained by the trail camera, with or without analyzing content of the images.

21 Claims, 4 Drawing Sheets

(56) References Cited

U.S. PATENT DOCUMENTS

2015/0145421 A1\* 5/2015 Chung ................ H05B 47/105
                                                                         315/158
2016/0105644 A1\* 4/2016 Smith ................ G08B 29/185
                                                                         348/159

\* cited by examiner

Trail Camera 100

Received Inputs 204

Control Outputs 206

Controller 202

Storage 208

Power Supply 210

FIG. 2

ADAPTIVE TRAIL CAMERAS

PRIORITY

This application claims priority to U.S. Provisional Application No. 61/926,305, filed Jan. 11, 2014, and U.S. Provisional Application No. 62/006,237, filed Jun. 1, 2014, both of which are incorporated herein by reference in their entirety.

BACKGROUND

Hunters, biologists, and others interested in learning about wildlife often deploy trail cameras (aka "game cameras," "camera traps," "hunting cameras," etc.) to obtain pictures of wild animals. In many cases, the user sets up the trail camera with certain preconfigured settings and then leaves the camera in an area for some time before returning to download the pictures/video. This can be problematic, because often the user may choose preconfigured settings that lead to poor camera performance, and the user may not be able to change the settings without returning to the camera. Although some cameras may have cellular or other wireless communication capabilities, these capabilities may not always be available to change such settings (e.g., no cell service). Even with full-time connectivity, it may be inconvenient for users to have to manually reconfigure their trail cameras from remote locations.

SUMMARY

Consistent with the inventive concepts, there are provided a variety of techniques and devices for adaptively adjusting trail camera settings responsive to conditions detected at a trail camera. One implementation comprises a computing device having a processing unit and a hardware memory device or hardware storage device storing instructions. When executed by the processing unit, the instructions cause the hardware processing unit to receive trail camera conditions from a trail camera over a wired or wireless network, determine a setting adjustment for the trail camera based on the received trail camera conditions, and send a setting adjustment request to the trail camera, the setting adjustment request identifying the determined setting adjustment.

Another implementation comprises a computing device having a lens, a motion detector, a flash, and a controller. The controller is configured to detect conditions at the trail camera and adjust settings of the trail camera responsive to the detected conditions.

Another implementation comprises a method or technique of controlling a trail camera. The method includes causing the trail camera to operate in a first configuration when deployed by a user and, after the trail camera has been deployed, detecting trail camera conditions at the trail camera. The method also includes, in the absence of explicit user input, altering trail camera settings of the trail camera to place the trail camera into a second configuration. The trail camera settings can be altered based on the detected trail camera conditions. The method also includes causing the trail camera to operate in the second configuration.

BRIEF DESCRIPTION OF THE DRAWINGS

FIG. 2 is a block diagram of certain logical components of a trail camera consistent with certain embodiments of the inventive concepts discussed herein.

DETAILED DESCRIPTION

Figure 1:
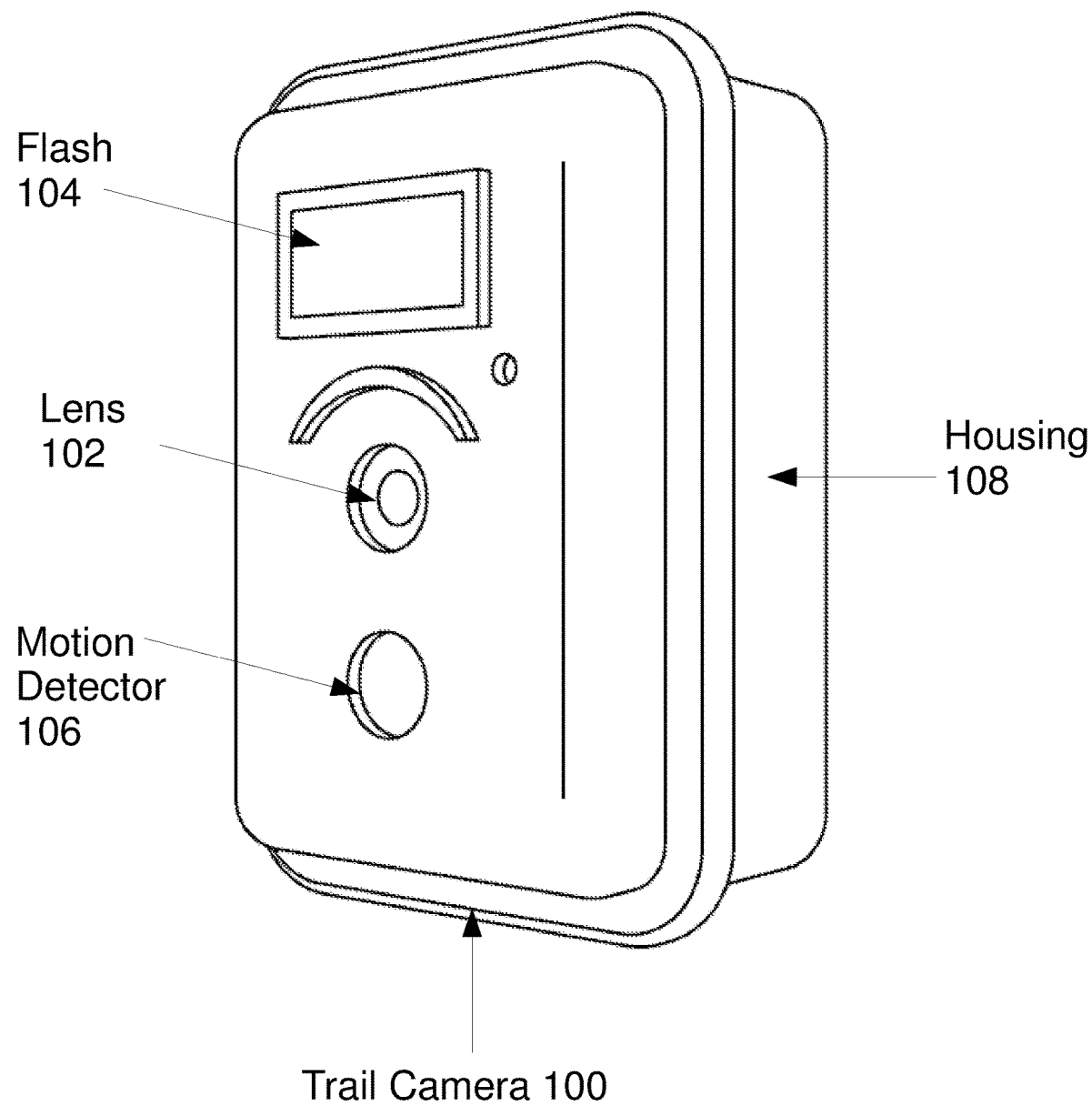
FIG. 1 is a diagram of a trail camera consistent with certain embodiments of the inventive concepts discussed herein.

FIG. 1 illustrates an exemplary trail camera 100 consistent with certain embodiments of the present inventive concepts. Trail camera 100 can include a lens 102, flash 104, and a motion detector (motion sensor) 106 embodied in a housing 108. Generally, the motion detector can be configured to detect movement (e.g., of animals) within a field of view of the trail camera. When motion is detected, the motion detector can be used to trigger the trail camera to take a picture via lens 102. In some implementations, the motion sensor includes a pyroelectric sensor and separate processing capability to trigger the controller to take a picture or video. The pyroelectric sensor can be activated based on a temperature gradient, such as can be produced by a moving animal. The motion sensor may have an adjustable sensitivity setting that determines how much of a gradient is sufficient to trigger the motion sensor (and/or adjustable amplifier gain) to cause the controller to take a picture/video. Other implementations may use other motion detection techniques such as acoustic, radar, etc. As discussed more below, the controller may adaptively adjust the motion sensor sensitivity based on various criteria, e.g., adjusting a passive infrared motion sensor (PIR) sensitivity.

When taking pictures at night or otherwise in conditions with little ambient light, flash 104 can be used to illuminate the field of view. Trail camera 100 can be embodied in various different forms, as shown in the following U.S. Patent References: U.S. Patent Publication Nos. 2013/0010109 to Chen (application Ser. No. 13/425,854), 2011/0150450 to Schnell (application Ser. No. 13/005,701), and 2002/0159770 to Moultrie (application Ser. No. 09/845,641), each of which is incorporated by reference herein in its entirety. The controller may also adjust the intensity of visible or infra-red light produced by the flash when taking nighttime pictures/video.

FIG. 2 illustrates a logical view of certain internal components of trail camera 100, e.g., as can be contained within housing 108. The trail camera can include a controller 202 that receives inputs 204 from various components of the camera (e.g., the motion sensor) and can also provide control outputs 206 to components of the camera (e.g., triggering the flash, a shutter, etc.). Image storage 208 can be used to store images (e.g., digital images and video) captured by the trail camera. Note that, for the purposes of this document, the term "picture" implies a still digital photograph, whereas the term "image" implies either a still digital photograph or a frame (e.g., an I-frame) of a digital video. The trail camera can also include power supply 210 (e.g., batteries) can provide power to the various components of the trail camera. Note that the motion sensor may have a separate power supply from the controller (e.g., each can be powered by separate batteries).

In some embodiments, the controller can include a standard computer processing device (e.g., CPU) with an associated memory/storage device and instructions (e.g., as would be found in a laptop or other consumer computing device). In other cases, due to power constraints, the controller can include a power-conserving processing device that can be activated when needed by inputs from the motion sensor that trigger the controller to start performing processing such as that discussed herein. In other words, instead of running the processor full time, the processor can run various tasks such as obtaining weather data, evaluating images, making control adjustments, etc., when "awakened" by the motion sensor and then go back to sleep until triggered again. In addition/alternatively, a local clock can be used to periodically awaken the processor to perform these functions. In either case, the processing device can be configured with logic (e.g., computer-readable instructions, logic gates, etc.) that causes the trail camera to perform certain adaptive techniques as set forth further herein. Note that some implementations may also use one or more dedicated electronic circuits, e.g., FPGAs, ASICs, etc., instead of programmable processors, to implement the controller.

Example Method

Figure 3:
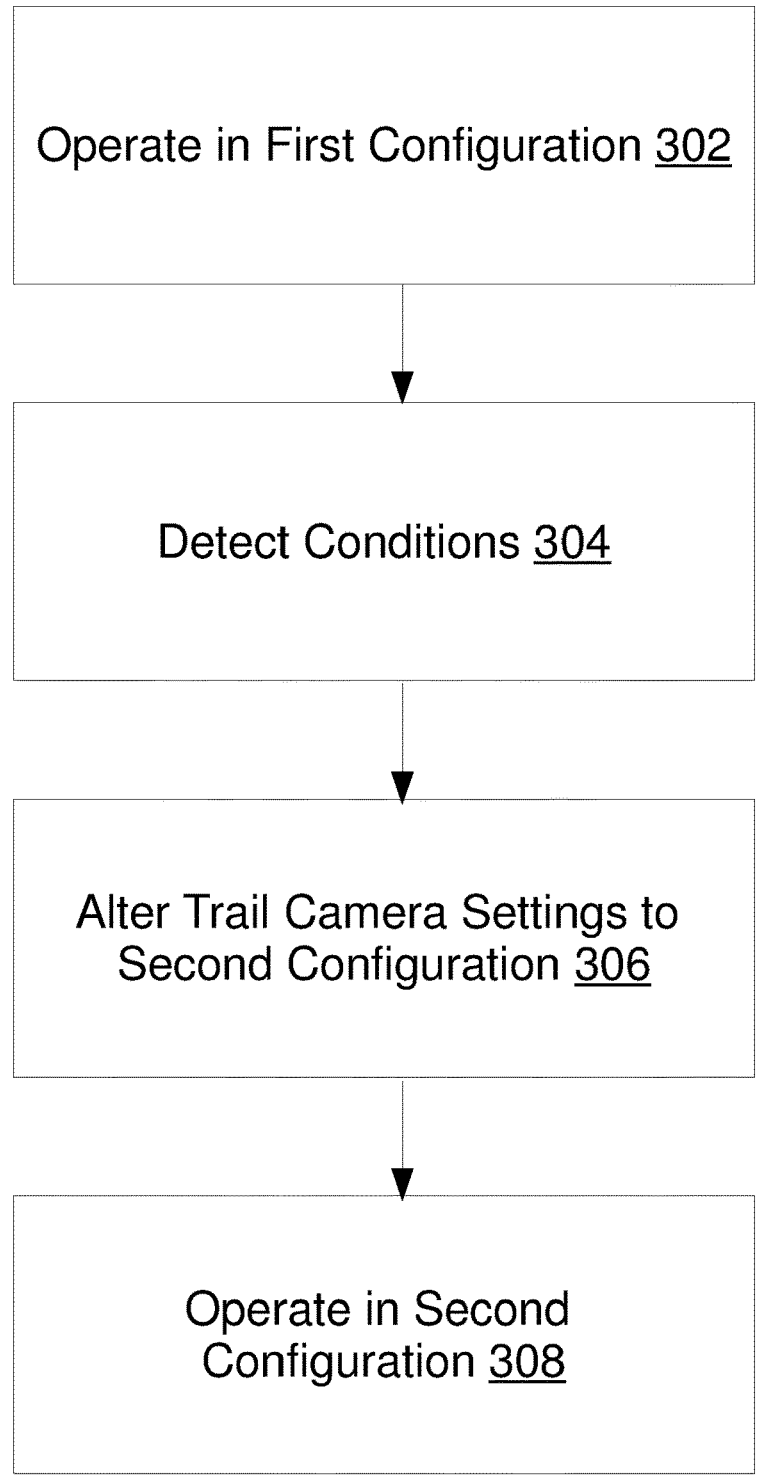
FIG. 3 is a flow chart of a method consistent with certain embodiments of the inventive concepts discussed herein.

FIG. 3 illustrates an exemplary method 300 for controlling a trail camera. In some embodiments, method 300 can be performed directly by trail camera 100. In other embodiments, certain parts of method 300 can be performed by another device (mobile phone, tablet, laptop, etc.) in communication with trail camera 100, as discussed more below.

Method 300 begins at block 302, where the trail camera operates in a first configuration. For example, the first configuration can represent the configuration of the trail camera when deployed by a user. In some cases, the first configuration can include various settings entered by the user to the trail camera when initially deploying the trail camera. Additionally or alternatively, the first configuration can include various default settings of the trail camera.

Method 300 continues at block 304, where certain conditions are detected. For example, the conditions may relate to storage availability on the trail camera, remaining battery capacity, weather conditions, activity-related conditions based on pictures/video taken by the trail camera, etc.

Method 300 continues at block 306, where the trail camera settings are altered to a second configuration based on the detected conditions. For example, the trail camera can be altered to switch from a time lapse mode to a triggering mode (or vice versa), altered picture/video resolution, altered flash intensity, altered motions sensor sensitivity, as well as other settings discussed further herein.

Method 300 continues at block 308, where the trail camera operates in the second configuration according to the altered settings.

Note that method 300 can be performed continuously over time with multiple changes to settings. For example, blocks 304, 306, and 308 can be performed multiple times after the trail camera is deployed as new conditions are detected. In some cases, the conditions are evaluated when the controller "wakes up" responsive to a signal from a local clock or when triggered by the motion sensor. In other cases, the conditions are evaluated as a background task when the controller is active. Also note that blocks 304 and 306 in particular can alternatively be performed by a remote device such as the aforementioned mobile phone, tablet, or laptop. Generally, in such embodiments, block 304 can include the remote device detecting conditions by receiving the conditions from the trail camera and/or other devices (e.g., weather servers) and block 306 can include sending instructions to the trail camera to alter various settings thereon.

Figure 4:
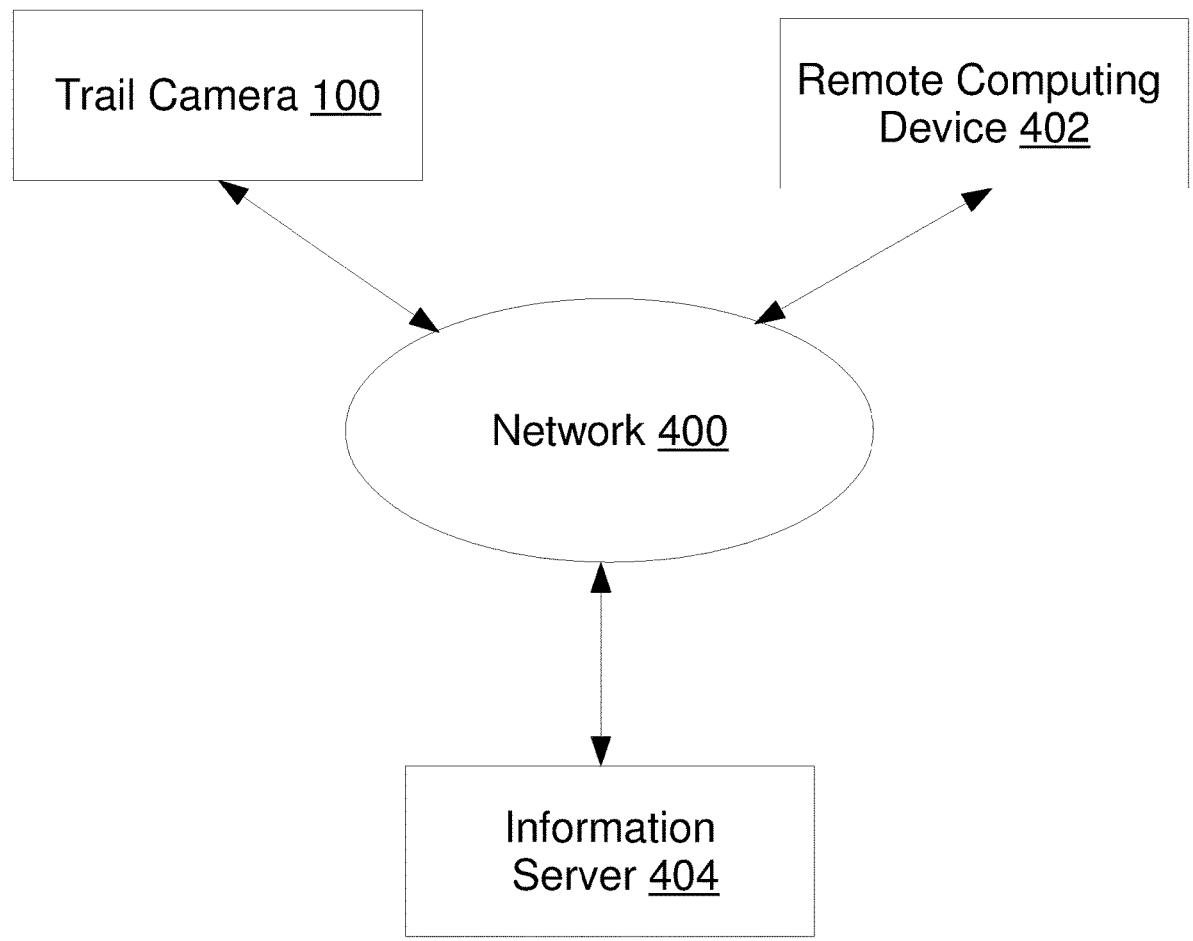
FIG. 4 is a block diagram of a system consistent with certain embodiments of the inventive concepts discussed herein.

FIG. 4 illustrates an exemplary system of devices including a trail camera 100, remote computing device 402, and information server 404 connected to a wired and/or wireless network 400. In some implementations, remote computing device 402 can control trail camera 100 over network 400. In some implementations, either remote computing device 402 or trail camera 100 can access information server 404 and control the trail camera based on information obtained therefrom, such as weather information discussed further herein.

In some implementations, the trail camera also includes a communication component (e.g., a wireless transceiver) configured to communicate via Wi-Fi, 3G/4G, Bluetooth, or other wireless communication technologies to access remote devices such as remote computing device 402 (e.g., short-range wireless with a local user's smart phone, tablet, laptop, etc.) and/or an information server over the Internet. The trail camera can also include an internal location module (e.g., GPS, cellular triangulation, etc.) configured to obtain a location of the trail camera, or else receive a location from a local user device. The trail camera can be configured to send the location to a weather server or other remote device to obtain weather information therefrom, e.g., current weather conditions at the location of the trail camera. As discussed more below, current weather conditions can be used by the controller to control various camera settings. In further implementations, the trail camera may have an internal or external weather instrument such as thermometer, barometer, and/or hygrometer to measure temperature, barometric pressure and/or humidity, respectively. In this case, certain adjustments can be performed based on measurements performed by these internal instruments instead of using remotely-obtained weather data. For the most part, the discussion below focuses on network implementations where weather data is obtained remotely, but note that local instrumentation by barometer/hygrometer/thermometer can also be used by the controller to determine when to perform certain setting adjustments as described herein. For example, the user may specify particular conditions (e.g., certain temperature ranges/thresholds, barometric pressure ranges/thresholds/gradients, and/or hygrometer ranges/thresholds) under which any of the adjustments discussed herein should be performed by the controller 202.

In some embodiments, the controller is configured to provide both a time-lapse mode and a triggering mode. In the time-lapse mode, the trail camera gathers pictures/video at preset intervals irrespective of whether the motion sensor triggers, and indeed the motion sensor may be turned off in this mode. For example, in time lapse mode, the trail camera can be configured to take a single picture (or multiple pictures or one or more videos) at regular intervals such as every minute, every 5 minutes, etc. In the triggering mode, the trail camera takes a picture (or multiple pictures/video) when the motion sensor triggers the controller to do so.

In further embodiments, the controller is configured to switch between a video mode and a picture mode. Generally speaking, in video mode, the controller may cause the trail camera to store videos, e.g., in video formats such as .avi. In picture mode, the controller is configured to take individual pictures such as in a .jpeg format. Picture mode may have user-configurable burst settings to take a certain number of pictures for each activation of the motion sensor or "trigger" (e.g., 1, 3, or 6 pictures) whereas video mode may have user-configurable video length settings (e.g., 5, 10, or 15 seconds).

Note that the camera can be in various combinations of time-lapse/triggering and video/picture modes. For example, time-lapse mode can allow for the following combinations of picture/video modes—time-lapse single picture mode (e.g., take a single picture every minute), time lapse burst mode (e.g., take 3 pictures at one second intervals every minute), and time lapse video mode (e.g., take a 5 second video every minute). Likewise, triggering mode can allow for the following combinations of picture/video modes—triggering single picture mode (e.g., take a single picture when triggered by the motion sensor), triggering burst mode (e.g., take 3 pictures at one second intervals when triggered by the motion sensor), and triggering video mode (e.g., take a 5 second video when triggered by the motion sensor).

In some implementations, the controller may adjust the number of pictures taken per trigger in triggering mode, e.g., from 1 to 3, 3 to 6, or 6 to 3, 3 to 1, etc. In further implementations, the controller may adjust the length of videos taken per trigger in triggering mode. In addition, the controller may adjust the resolution of pictures/video taken to higher/lower resolutions.

Adaptive Control Mechanisms

As discussed above and in more detail below, the trail camera can be configured by the controller to selectively alter certain settings after being deployed without receiving further user inputs to place the trail camera in a different configuration than when initially deployed by the user. For example, after being deployed, the controller can perform any of the following adjustments: transition between time lapse mode and triggering (picture or video) mode, adjust picture mode to increase/decrease number of pictures taken or adjust the lengths of video taken in video mode, adjust picture/video resolution, adjust motion sensor sensitivity, adjust flash intensity, and, in implementations where the camera has multiple view angles, adjust view angle settings.

In order to determine when to perform any of the aforementioned adjustments, the controller may apply certain criteria relating to certain conditions. In some examples, the criteria may be input by a user, e.g., the user may select a particular time of day when the camera should transition to/from time lapse mode to video or picture mode. In other examples, the criteria may be determined learned by the controller, e.g., if a given motion sensor setting is not resulting in many triggers of the camera, the motion sensor setting may be automatically increased by the controller.

Image Analysis

In some cases, the criteria used by the controller to determine whether to adjust a setting may relate to when/how many pictures or video are taken irrespective of the content of the pictures or video. In other implementations, the criteria used by the controller to determine whether to perform a particular adjustment may be based on analysis, by the controller, of images from picture/video taken by the trail camera. For example, the controller may analyze content of images for characteristics of animals (e.g., contiguous areas of pixels within a range from brown to black) and can then cause the camera to switch to time lapse mode at times of day when more such images tend to be taken. In other words, the controller can use previously-taken images as training data to adaptively perform certain adjustments by identifying specific times of day to use different settings.

Note that some implementations may also use different colors depending on species of interest. For example, a user searching for black bears may be able to configure the camera to use very dark (e.g. ranging from black to near-black, brownish-black) pixels for identifying whether images are likely to have animals of interest (although note that is not necessarily the case, as the user may also be interested in lighter browns/cinnamon as black bears come in multiple color phases). In contrast, a user searching for deer may configure the camera to use pixel ranges representing browns to greyish-browns for causing the mode switch. Note also that the requisite number of pixels can be defined in various ways, e.g., 90% of pixels within a contiguous area that constitutes at least 5% of the image falling within a specified color range may be sufficient to be considered as an image that likely includes a game animal of interest for the purpose of determining whether to perform certain adjustments discussed herein.

Using contiguous areas of pixels within a certain color range is just one example of a technique that can be used to identify whether a particular image likely includes an animal. Further implementations may use additional image processing techniques to identify edges, colors, and other image features of training images that are labeled to indicate whether the images include animals. These training images and features of the training images can be used to train a classifier that can be provided on the trail camera and used to classify images taken when deployed. For example, a neural net (or other classifier, e.g., support vector machine, etc.) can be trained offline using labeled images and the trained neural network can be uploaded to the trail camera. Then, the controller can extract image features from each captured image and evaluate the features using the trained neural network. The trained neural network may perform simple binary classification of each image as (animal present, no animal present) or may use more refined classifications (e.g., by species, sex, trophy status, etc.). As mentioned, the training can be performed on labeled training examples, e.g., known images of animals labeled by species, sex, trophy status, or simply as yes/no as to whether the images includes an animal. In some cases, the labeled training examples can be specific to the type (e.g., model) of camera, particular geographic locations, etc. The outputs of the classifier can be used to determine which images qualify for the purposes of determining whether to perform certain adjustments as discussed herein.

Qualifying Pictures

In some implementations, the controller may perform certain aforementioned adjustments based on not only the existence of certain images (or other indications that a trigger occurred, such as a log of motion sensor triggers over time), but by analyzing the content of the images. For example, the analysis may be used to determine whether animals appear in images taken previously by the camera and/or characteristics of such animals. For the purposes of the following, a "qualifying image" (or "qualifying picture" or "qualifying video") is an image obtained from picture/video that is determined by the controller to likely include an animal of interest (e.g., as specified by a user). As noted above, this determination can be made based on contiguous pixels within a given range in the image, applying a trained image classifier to the image, or other mechanisms. This document makes numerous references to control setting adjustments that can be performed based on a number of qualifying images. These adjustments can also be performed based simply on a number of pictures without evaluating the content of the images. These adjustments can also be made based on a number of triggers irrespective of the number of images. Indeed, some implementations may allow the motion sensor to trigger without actually taking images under some circumstances, and these triggers can also be used for the setting adjustment techniques discussed herein.

Some implementations may perform persistent adjustment of camera settings based on aggregate camera activity in the recent past, e.g., the adjustment lasts until the camera is powered off or another adjustment is performed. For example, the trail camera may initially be deployed in a given mode configuration (e.g., triggering and picture). If insufficient activity (relatively few total pictures or qualifying pictures taken) is detected after a given amount of time, the controller can automatically switch the trail camera over to a different mode configuration (e.g., time lapse and picture). In some cases, a user may be able to input certain criteria, e.g., a number of days and an aggregate picture threshold. For example, assume the user selects 10 days and 100 pictures. If 10 days go by and fewer than 100 pictures are taken during those 10 days, the controller may automatically and persistently transition the camera to a different mode. Likewise, transitions can be made between modes when the number of pictures exceeds the aggregate picture or trigger threshold (e.g., the adjustment would occur if more than 100 pictures were taken or triggers occurred during the 10 days, perhaps to decrease the number of pictures taken per trigger in triggering mode). Further implementations may require a minimum number of pictures per day or triggers per day to perform the adjustment, e.g., if the minimum is 5, then if there were any day out of the 10 days with fewer than 5 pictures, the adjustment would not occur.

When qualifying pictures/video are obtained sufficiently frequently at a given time of day over a period of time, the trail camera may perform a temporary adjustment so that the trail camera uses different settings only during that time of day. For example, suppose a user configures the trail camera to switch a given setting when two criteria are met: (1) at least two qualifying pictures are taken by the camera within a given half-hour period and (2) for at least 7 straight days. Now, suppose that between 10 and 10:30 AM the trail camera has taken at least two qualifying pictures every day for a week. In this case, the trail camera may automatically adjust the setting at 10 AM every day for ½ hour, and go back to a different (e.g., previous or default) setting at other times. Also note that some implementations may only require that a particular number of qualifying pictures are taken over a given amount of time, e.g., 14 qualifying pictures within a week for any ½ hour period may be sufficient to cause the adjustment. In this case, the adjustment may occur even if one day has fewer than 2 qualifying pictures, so long as the total number of pictures is at least 14. Note that some implementations may also simply use the number of pictures taken as the criteria without evaluating image content to determine whether the images qualify as including animals of interest.

As another example, some implementations may maintain a moving average of the number of qualifying pictures taken during time periods (e.g., each hour) of the day. Those time periods for which the moving average exceeds a threshold may result in one of the aforementioned temporary setting adjustments. As an example, if the threshold is 3 qualifying pictures per hour, and the moving average for 3-4 PM is 2.2 qualifying pictures, 3.2 qualifying pictures for 4-5 PM, and 2.8 qualifying pictures from 5-6 PM, then the adjustment could be performed at 4 PM and adjusted back to the previous or default setting at 5 PM. Note also the moving average can have a set window, e.g., only the most recent 10 days may be considered for the purposes of computing the moving average. Further implementations may use a decay factor for the moving average. Again, other implementations may disregard the content of the images for such purposes and simply rely on the number of images taken irrespective of their content.

As discussed above, in some implementations, no analysis of the pictures/video takes place and, in these cases, any picture/video can be considered "qualifying" for the purposes of determining whether to perform the adjustments discussed herein. Generally, the idea is that some implementations may cause any of the adjustments discussed herein without analyzing the images, and in this sense any image can be deemed as "qualifying." Other implementations may analyze the images obtained according to the aforementioned criteria (contiguous pixels, using a trained classifier, etc.) and only use images that meet the criteria to determine whether to perform certain adjustments. This can be useful to avoid performing certain adjustments based on "false triggers," e.g., triggers that are not due to animals but caused by other (e.g., wind) activations of the motion sensor. As noted above, further implementations may consider motion triggers without regard to whether images were even taken responsive to the triggers.

User Inputs

In some implementations, some or all of the criteria used by the controller to adjust various settings at particular times are user-configurable. For example, the trail camera may provide various user interface mechanisms such as one or more switches or other mechanical inputs on the trail camera (e.g., dials, buttons/keys, etc.), a touch screen, etc. The trail camera may also have a wireless interface (e.g., Bluetooth, Wifi, cellular) that allows the user to configure the criteria via a remote computing device (e.g., tablet, cell phone, laptop, desktop, etc.) that is in wireless communication with the trail camera. Indeed, in some implementations, the user may even control the trail camera from their home or office via the Internet. In further implementations, a USB or other wired connection can be used instead of wireless. In still further implementations, another wireless-capable trail camera can perform the techniques discussed herein by sending one or more control messages to alter the configuration of a given trail camera. In some cases, the trail camera being controlled can report various local conditions such as weather, number of images taken, content of images taken, and/or the images themselves to the controlling device. In other implementations, no reporting is needed because the trail camera controller performs the techniques discussed herein locally.

Time-Lapse and Triggering Mode

Ambient Light

In some cases, the trail camera can be configured to switch between the time-lapse mode and the triggering mode. For example, using the time-lapse mode during nighttime can result in excessive power usage due to flash activations. Thus, some implementations control the trail camera based on a light sensor that can be part of the trail camera. When the light sensor inputs indicate sufficient ambient light (e.g., above a threshold) is available to take pictures without use of the flash (e.g., daytime), the time-lapse mode can be used. When the light sensor inputs indicate that there is no longer sufficient light (e.g., below the threshold due to sunset and/or weather, etc.) the controller can automatically transition the trail camera to the triggering mode. Likewise, the controller can automatically transition the camera back to time lapse mode the next time there is sufficient light (e.g., due to sunrise). Some implementations may provide the user with three different settings, e.g., time lapse always setting, trigger always setting, or time-lapse day and trigger night setting.

Other implementations may allow for concurrent time lapse and triggering functionality, where the camera takes pictures/video at specified regular intervals (e.g., every minute) but also takes pictures/video when triggered by the motion sensor. In some implementations, the amount of ambient light can be used to turn on/off either the time lapse or triggering functionality individually. For example, the camera can operate in concurrent time lapse and triggering mode when sensed light conditions are relatively bright but switch to triggering only or time lapse only when sensed light conditions are low such as at night. Alternatively, nighttime/dusk/dawn conditions may be more interesting for the user and some implementations perform both time lapse and triggering during low light conditions but either or both of these modes is turned off during brighter conditions.

Manually Based on Time of Day

Further implementations may transition between time lapse and triggering mode based on time of day. Some game animals tend to move more during early morning hours and late evening hours. Thus, in some implementations, the controller can switch to the time lapse mode at particular times of day, e.g., from 5 PM to 6 PM and from 7 AM to 8 AM. Note also that in further implementations the controller may configured to adaptively change the times of day for the triggering/time-lapse mode switch based on sunset and sunrise, e.g., as determined using a table of sunrise/sunset times by date. Thus, the user may be able to configure the trail camera to start time lapse mode at 30 minutes before sunrise and go back to triggering mode one hour after sunrise, for 90 minutes of time lapse mode each morning. The controller may adjust the time of day for each transition based on the sunrise/sunset table to follow changes in the sunrise. The controller may take similar actions for sunset. Note that the durations for sunset are not necessarily the same as for sunrise, e.g., the user could configure the controller to activate the time lapse mode 45 minutes before sunset and go back to the triggering mode 15 minutes after sunset. Note that this can also be performed to determine when concurrent time lapse and triggering modes are used, e.g., allowing concurrent time lapse and triggering during daytime and turning off either or both of time lapse or triggering at night. Other times of day can also be used to select when to turn on/off time lapse and/or triggering modes or when to use both concurrently.

Wind Detection Via Ambient Noise

Some implementations may also transition from triggering to time lapse mode in the presence of excessive wind, which can cause false motion sensor triggers. For example, some implementations may employ a microphone to monitor ambient noise and transition to time lapse mode based on the ambient noise. Often, wind results in relatively sustained higher levels of sound, whereas animal sounds tend to occur in the vicinity of the camera for only short periods of time. Thus, when sounds captured by the microphone suggest that it is particularly windy, the controller may transition the camera to time lapse mode. Conversely, when the ambient noise quiets down, the controller may transition the camera to triggering mode. Note that some implementations may require a certain duration of increased noise volume (or a moving average volume over a certain amount of time exceeding a threshold). This may avoid transitioning to the time lapse mode due to noises made by an animal moving in the vicinity of the trail camera. Again, wind can also be used to determine when time lapse and triggering mode run concurrently and when one or both of these modes is turned off. For example, one specific implementation allows for concurrent time lapse and triggering under some conditions but when windy conditions occur the triggering functionality is turned off while time lapse functionality continues.

Note also that volume is but one characteristic of sound that can be used to determine whether wind is responsible for ambient noise. Further implementations may use sound feature vectors and train a classifier (e.g., a neural network, support vector machine, nearest neighbor, etc.) to discern ambient wind noise vs. animal sounds. For example, labeled training examples of animal sounds and wind taken with the camera microphone can be used to extract sound feature vectors and train the classifier. The trained classifier can be uploaded to the trail camera and used by the classifier to determine when given sounds are likely due to wind or, alternatively, likely due to animals (e.g., sounds of animals moving near the camera). When the classifier indicates that a sound received at the camera is likely due to wind, the controller may transition to time lapse mode for a period of time (e.g., one hour, or until the ambient sound no longer is classified as likely due to wind). When the classifier indicates that sound received at the camera is likely due an animal, the controller may stay in, or transfer to, the triggering mode. Note sound can also be used to turn off either time lapse or triggering functionality at certain times (e.g., noise above a threshold) and use both concurrently at other times (e.g., noise below the threshold) or vice versa (concurrent below the threshold and turn off when above the threshold).

Weather Server

In other implementations, the trail camera may communicate via wireless (e.g., cellular) with a weather server or other computing device that provides weather conditions for the current location of the camera (e.g., as determined by a GPS device on the camera or a location uploaded from a smartphone to the camera). The controller may use the current weather conditions to determine whether to transition to triggering mode from time lapse mode or vice versa, e.g., to triggering if the current conditions are relatively still and to time lapse if the current conditions are relatively windy. For example, a wind velocity threshold may be employed (e.g., mph, either gusts or sustained) and velocities below the threshold cause the camera to operate in triggering mode and above the threshold in time lapse mode. In other implementations, time lapse and/or triggering functionality can occur concurrently during certain weather conditions (e.g., low wind) and turned off individually during other weather conditions (e.g., turn off triggering mode when the weather server reports high wind while continuing to perform time lapse functionality).

Similarly, other weather conditions can be mapped to particular modes, e.g., switch to time lapse mode during thunderstorms, snow showers, etc., and triggering mode otherwise (clear, cloudy, light rain). Other implementations may map specific weather conditions to when triggering and time lapse mode should be performed concurrently. For example, a scientist particularly interested in animal behavior during the rain may wish to have the camera in triggering mode at all times and turn on the time lapse mode as well when rainy conditions occur.

Furthermore, these adjustments can also be performed responsive to observed values of local temperature/barometric pressure/humidity using instruments on the trail camera itself or received weather data. For example, the user can define a particular temperature below (or above) which the camera should switch from time lapse to trigger mode or vice versa and/or when both modes should operate concurrently. Alternatively, specific humidity and/or barometric pressure ranges can be defined for switching between these modes or for concurrent execution of the modes. Further, some implementations may use a combination of the instrument values, e.g., if temperature is above 40 degrees Fahrenheit, barometric pressure is falling faster than a predetermined rate, and humidity is at least 50%, then use time lapse mode.

Historical Activity—Persistent Adjustment

Other implementations may perform persistent transitions between time lapse and triggering mode based on camera activity (e.g., number of triggers, number of pictures, number of qualifying pictures, etc.). For example, the trail camera may initially be deployed in the triggering mode. However, if recent activity has been insufficient, e.g., relatively few (e.g., qualifying) pictures or triggers taken in a given amount of time, the controller can automatically switch the trail camera over to time lapse mode or to concurrent time lapse and triggering (e.g., all day, only during daylight hours, etc.). In some cases, a user may be able to input certain criteria, e.g., 10 days and 100 pictures. If 10 days go by with fewer than 100 (e.g., qualifying) pictures taken over the 10 day period, the controller may automatically transition the camera to time lapse mode only or to time lapse and triggering mode operating concurrently.

In some cases, the camera may be deployed in concurrent time lapse mode and triggering mode. Upon detection of significant activity (e.g., meeting user criteria specifying 100 total motion sensor triggers over 10 days, etc.), the camera can automatically disable the time lapse mode and operate only in the triggering mode. The general idea here is that there is sufficient triggering activity so that the user will likely get quite a few pictures/video in triggering mode, so there may be less reason to stay in time lapse mode.

Historical Activity—Temporary Adjustment During Particular Time Period

When pictures/video (perhaps evaluated to determine if qualifying as discussed elsewhere herein) are obtained sufficiently frequently at a given time of day over a period of time, the trail camera may perform a temporary adjustment so that the trail camera uses different settings only during that time of day. For example, suppose a user configures the trail camera to switch to time lapse mode during a particular time period when two criteria are met: (1) at least two qualifying pictures are taken by the camera within a given half-hour period and (2) for at least 7 straight days. Now, suppose that between 10 and 10:30 AM the trail camera has taken at least two qualifying pictures every day for a week. In this case, the trail camera may automatically transition to time lapse mode at 10 AM every day for ½ hour, and go back to triggering mode at other times (or use concurrent time lapse/triggering during those times and only time lapse or only triggering at other times). Also note that some implementations may only require that a particular number of qualifying pictures are taken over a given amount of time, e.g., 14 qualifying pictures within a week for any ½ hour period may be sufficient to cause the switch to time lapse mode during that time period. In this case, the adjustment may occur even if one day has fewer than 2 triggers, pictures, or qualifying pictures during the time period, so long as the total number is at least 14.

As another example, some implementations may maintain a moving average of the number of qualifying pictures taken during time periods (e.g., each hour) of the day when the camera is in triggering mode. The controller may transition the trail camera to enable time lapse mode (with or without triggering mode) during time periods for which the moving average exceeds a threshold. As an example, if the threshold is 3 triggers/pictures/qualifying pictures per hour, and the moving average for 3-4 PM is 2.2 triggers/pictures/qualifying pictures, 3.2 for 4-5 PM, and 2.8 from 5-6 PM, then the adjustment to enable time lapse mode (with or without triggering mode) could be performed at 4 PM and adjusted back to the triggering mode only at 5 PM.

Current Activity

Some implementations may evaluate images or video immediately after they are taken for short-term adjustments to enable or disable either time lapse/triggering mode. For example, suppose the camera triggers a first time and the image is analyzed by a classifier trailed to recognize certain animals (e.g., deer generally, adult male deer, etc.). If the image is deemed qualifying, the camera may transition to the time lapse mode and take, e.g., one picture every 5 seconds for the next 5 minutes and then transition back to triggering mode (or the time lapse mode can be enabled while triggering mode remains active). Alternatively, the camera may evaluate images taken in time lapse mode and decide, in some instances, to transition to triggering mode (with or without continuing in time lapse). For example, if a certain number of consecutive pictures are taken, evaluated, and determined to be non-qualifying (e.g., 100 pictures straight without an animal) or below a percentage threshold (e.g., less than 3% of pictures taken in a given period of time have an animal) then the camera may transition to triggering mode persistently or for a given period of time (e.g., one hour). This can effectively take the trail camera out of triggering mode when the triggering mode is failing to capture many pictures of animals. This may be particularly useful in instances when false triggers are causing the trail camera to waste storage space with images as can be caused by wind or other conditions.

Picture Vs. Video Mode

Ambient Light

Much of the above discussion with respect to transitioning to/from time-lapse and triggering mode can also be applied in the context of transitioning to/from picture and/or video mode. Likewise, the above discussion can also be applied in the context of transitioning from taking relatively more or fewer pictures in picture mode (e.g., from 3 to 6 pictures per trigger or from 6 to 3) or to taking longer or shorter videos in video mode. As one example, flash activations for video mode may be relatively demanding, so when the light sensor inputs indicate sufficient ambient light is available to take pictures without use of the flash (e.g., daytime), video mode can be used (e.g., turned on when light sensor indicates brightness above a threshold). When the light sensor inputs indicate that there is no longer sufficient light (e.g., due to sunset) the controller can automatically transition the trail camera to picture mode (burst or single picture, responsive to brightness falling below the threshold). Thus, the flash may be used only for pictures at night for very short periods of time (the length of the flash) when taking pictures instead of sustaining extended periods of flash for videos. Likewise, the controller can automatically transition the camera back to video mode the next time there is sufficient light (e.g., due to sunrise). For example, the camera may provide the user with different control settings—video mode always, picture mode always, or video mode day and picture mode at night (in which case the controller applies the aforementioned transitions). Note that the above technique can be applied in time lapse mode as well, e.g., taking videos at predetermined intervals during ample ambient light (e.g., once every 5 minutes during the day) and pictures at predetermined intervals when there is insufficient ambient light (e.g., once every minute at night).

Number of Pictures/Length of Video

Note that the above discussion with respect to adjusting configurations when brightness exceeds or falls below a threshold also applies to the number of pictures or length of video taken, e.g., per trigger or in time lapse mode. For example, the camera may transition to only taking single pictures at night or during other periods of insufficient light to save flash (at fixed intervals in time lapse mode or per trigger in triggering mode), and transition back to taking multiple pictures (e.g., take 3 pictures every minute in time lapse mode or 3 pictures per trigger in triggering mode) during the day or other conditions with sufficient light. Further implementations may use multiple pictures, transitioning to using fewer at night (e.g., 3 pictures per trigger) and more (e.g., 6 pictures per trigger) during the day. Users may provide inputs (e.g., when the camera is initially deployed) to select the number of pictures per trigger to take at daytime and a different number of pictures per trigger to take at night. Similarly, users may provide inputs to select the length of videos taken during the day vs. at night, e.g., shorter videos at night when the flash is used (e.g., 10 second videos during the day and 5 seconds at night).

Picture/Video Resolution

Note that the above discussion also applies to the resolution of pictures or video taken at day or at night, which can also be adjusted when brightness exceeds or falls below a given threshold. For example, the user may prefer to take higher resolution/video during daytime or other periods of sufficient light (brightness above the threshold), and may be content with relatively lower resolution pictures/video at night (brightness below the threshold). In some implementations, the trail camera may transition to a relatively lower resolution setting for pictures or video at night or other low-light conditions, and transition back to taking higher resolution pictures/video during the day or other conditions with sufficient light. Alternatively, higher resolution images may be taken at night then during the day.

Manually Based on Time

Again, the transitions can be based on time of day. In a manner similar to that discussed above, the controller can switch to the video mode at particular times of day, e.g., from 5 PM to 6 PM and from 7 AM to 8 AM, and otherwise transition back to single or multiple picture mode at other times. Again, the particular times can be user-configurable, e.g., via user interface mechanisms as discussed above (user specifies at deployment what times of day for video and what times for picture). Again, the controller may configured to adaptively change the times of day to switch between video and picture mode based on sunset and sunrise, e.g., effectively as a window of time that moves as sunrise/sunset times change from day to day. Thus, the user may be able to configure the trail camera to start video mode at 30 minutes before sunrise and go back to picture mode one hour after sunrise, for 90 minutes of time lapse mode each morning (or, again, from single picture to multiple and back or other configurations of greater/fewer numbers of pictures or shorter/longer videos). Once again, the controller may adjust the time of day for each transition based on a sunrise/sunset table to follow changes in the sunrise. The controller may take similar actions for sunset. Similarly, the durations for sunset are not necessarily the same as for sunrise, e.g., the user could configure the controller to activate the video mode 45 minutes before sunset and go back to the picture mode 15 minutes after sunset.

Number of Pictures/Length of Video

Again, the above discussion also applies to the number of pictures or length of video taken, e.g., per trigger or in time lapse mode. For example, the camera could by default be in single picture mode and switch to multiple picture mode from 5-6 PM and 7-8 AM, or take relatively longer videos at these times than at other times. Users may provide inputs to select the number of pictures per trigger (or per preset interval in time lapse mode) to take at certain user-selected times and a different number of pictures per trigger to take at other user-selected times. Likewise, in video mode, users may provide inputs to select the length of videos taken during most of the day and a second length of video to take at specified times of day (e.g., 10 second videos at all times except for 15 second videos between 10 and 11 AM). Again, these time periods can be specified relative to sunrise/sunset instead of relative to fixed times of day, e.g., the user can specify different numbers of pictures or different video lengths during windows of time near sunrise and sunset than at other times of day.

Picture/Video Resolution

Note that the above discussion also applies to the resolution of pictures or video taken at user-specified times of day. For example, the user may prefer to take higher resolution/video during certain times of day, e.g., 10-11 AM, and lower resolution pictures/video at other times. Again, the user may specify the periods relative to sunrise/sunset instead of fixed times of day. For example, the user may specify relatively higher resolution pictures/video be taken from 30 minutes before to 30 minutes after both sunrise and sunset. At those times, the controller can transition to taking relatively higher resolution pictures/video and then reduce the resolution of pictures/video taken at other times.

Wind Detection Via Ambient Noise

Examples discussed above with respect to transitioning between time lapse and triggering mode illustrate transitioning modes based on ambient noise, and those techniques (e.g., noise threshold based on microphone noise, classifier to distinguish animal vs. wind sounds, etc.) can be applied in an analogous fashion to (1) transition between picture/video mode, (2) adjust number of pictures/length of video, and/or (3) adjust picture/video resolution. For example, during periods of high ambient noise (particularly if using a classifier indicating wind noise) it can be useful to transition from video to picture mode when in the triggering mode. This is because the likelihood of false triggers increases during periods of high wind, so instead of using battery power and storage space to obtain videos that are more likely due to false triggers, pictures can be taken instead. In a similar manner, relatively shorter videos per trigger (or fewer pictures per trigger) can be taken during periods of high ambient noise (again, particularly if a sound classifier is used indicating the sound is due to wind), and relatively longer videos during other periods. Furthermore, relatively lower resolution pictures/video can be taken during periods of high ambient noise for similar reasons. Once ambient noise returns to lower levels and/or is no longer classified as wind noise, the controller can transition back to default settings.

Note that if the classifier indicates the noise is likely due to an animal than the opposite approach can be taken, e.g., any of taking videos instead of pictures when triggered, taking longer videos instead of shorter videos when triggered, taking more pictures when triggered, or taking higher resolution pictures/video when triggered. Again, the controller can transition back to default settings after a certain amount of time.

Weather Server

As noted above, the trail camera may communicate via wireless (e.g., cellular) with a weather server or other computing device that provides weather conditions for the current location of the camera, and the controller may use the current weather conditions to determine whether to (1) transition between picture/video mode, (2) adjust number of pictures/length of video, and/or (3) adjust picture/video resolution. For example, users may specify certain settings that can be used by the trail camera during specific weather conditions, e.g., based on wind, precipitation, sun, temperature, wind, etc. As one example, a wind velocity threshold may be employed (e.g., mph, either gusts or sustained) and velocities below the threshold cause the camera to do any of: transition from video to picture mode, transition from picture to video mode, increase the number of pictures/length of video taken per trigger, decrease the number of pictures/length of video taken per trigger, increase picture/video resolution, or decrease picture/video resolution. As also noted above, one particularly useful technique can be to (a) switch from video to picture mode, (b) switch to taking fewer pictures or shorter videos per trigger, or (c) reduce picture/video resolution during periods of high wind. This is because the wind increases the likelihood of false triggers and users may wish to invest fewer battery/storage resources in pictures/video taken under such conditions.

As suggested above, any of (a), (b), and/or (c) (or vice versa) can also be performed responsive to observed values of local temperature/barometric pressure/humidity obtained from a remote computing device or weather instruments on the trail camera. For example, the user can define a particular temperature below (or above) which the camera should adjust picture/video mode, number of pictures/length of video, and/or resolution. Alternatively, specific humidity and/or barometric pressure ranges can be defined for performing these adjustments. Further, some implementations may use a combination of the instrument values, e.g., if temperature is above 40 degrees Fahrenheit, barometric pressure is falling faster than a predetermined rate, and humidity is at least 50%, then use high resolution time lapse video of 15 seconds, and otherwise use triggering of low resolution pictures. Various other suitable combinations of instrumentation values and specific adjustments can also be employed.

Historical Activity—Persistent Adjustment

In a manner similar to that discussed above with respect to transitions between time lapse and triggering mode, some implementations may, based on historical camera activity persistently (1) transition between picture/video mode, (2) adjust number of pictures/length of video, and/or (3) adjust picture/video resolution. For example, the trail camera may initially be deployed in the picture mode, e.g., to save storage space. However, if insufficient activity is detected after a given amount of time, the controller can automatically switch the trail camera over to video mode (e.g., all day, only during daylight hours, etc.). In some cases, a user may be able to input certain criteria, e.g., a number of days and a number of pictures threshold, and if the threshold is not met during the specified number of days, the transition to video mode can take place. For example assume the user selects 10 days and 100 pictures. If 10 days go by with fewer than 100 total pictures taken during that time, the controller may automatically transition the camera to video mode. Note that some implementations may count only qualifying pictures (e.g., classified as having a game animal) for these purposes or only the number of triggers instead of pictures (particularly where some triggers do not result in a picture being taken). Also note that, in the alternative, the camera can be deployed in video mode and transition to the picture mode if sufficient activity is detected, e.g., using similar criteria, once 100 pictures are taken within 10 days the camera may transition from picture mode to video mode.

One motivating reason for the above is that the user may want to conserve storage space on the trail camera. By initially deploying the camera in the picture mode, storage will be used more slowly because pictures generally require less storage space than video. If, however, relatively little activity is taking place, it may make sense to go ahead and transition to video because there may be plenty of storage space on the trail camera given the relatively low rate at which triggers are occurring. Other examples of using historical activity in this context can include increasing the number of pictures or length of video per trigger when a given activity threshold is not met (e.g., fewer than 100 triggers, triggered pictures, or qualifying pictures in 10 days) or, alternatively, reducing the number of pictures or length of video per trigger when a given activity threshold is met (e.g., more than 100 triggers, triggered pictures, or qualifying pictures in 10 days). Likewise, picture/video resolution can be increased when the activity threshold is not met or, alternatively, increased when the activity threshold is met.

Historical Activity—Temporary Adjustment During Particular Time Period

As noted above with respect to time lapse vs. triggering mode, the controller can adjust settings so that the trail camera uses different settings only during that time of day, e.g., based on activity during recent days detected at those times. This technique can also be used to, at particular times of day, (1) transition between picture/video mode, (2) adjust number of pictures/length of video, and/or (3) adjust picture/video resolution. For example, suppose a user configures the trail camera to take any of these 3 acts during a particular time period when two criteria are met: (1) at least two triggers/pictures/qualifying pictures are taken by the camera within a given half-hour period and (2) for at least 7 straight days. Now, suppose that between 10 and 10:30 AM the trail camera has taken at least two triggers/pictures/qualifying pictures every day for a week. In this case, the trail camera may automatically transition from picture to video mode at 10 AM every day for ½ hour, and go back to picture mode at other times (or vice versa, e.g., picture mode at 10-10:30 AM and video mode at other times). Also note that some implementations may only require that a particular number of triggers/pictures/qualifying pictures are taken over a given amount of time, e.g., 14 triggers/pictures/qualifying pictures within a week for any ½ hour period may be sufficient to cause the switch to/from picture/video mode during these times. In this case, the adjustment may occur even if one day has fewer than 2 triggers/pictures/qualifying pictures during the time period, so long as the total number of pictures is at least 14. In some cases it may be computationally less expensive to not evaluate the pictures to determine if they are qualifying and instead simply transition at specific times based on the number of pictures or triggers recently taken at those times.

In a similar manner, the number of pictures per trigger or video length per trigger can be adjusted, e.g., taking relatively more or fewer pictures per trigger from 10:00 AM-10:30 AM or relatively longer or shorter videos during these times. Likewise, picture/video resolution can be altered at these specific times.

As also discussed with respect to time lapse vs. triggering mode, some implementations may maintain a moving average of the number of triggers/pictures/qualifying pictures taken during time periods (e.g., each hour) of the day. The controller may transition the trail camera during time periods for which the moving average exceeds a threshold. As an example, if the threshold is 3 triggers/pictures/qualifying pictures per hour, and the moving average for 3-4 PM is 2.2 triggers/pictures/qualifying pictures, 3.2 triggers/pictures/qualifying pictures for 4-5 PM, and 2.8 triggers/pictures/qualifying pictures from 5-6 PM, then any of the aforementioned 3 adjustments can be performed from 4-5 PM, e.g., going from picture to video mode during this hour period and back to picture mode at 5 PM, going from video mode to picture mode during this hour period and back to video mode at 5 PM, increasing/decreasing the number of pictures/length of video taken per trigger during this hour period and going back to a different number/length at other times of day, and/or changing the resolution of pictures/video taken at this time of day and going back to a default resolution setting at 5 PM. Again, implementations that do not analyze content of the images to determine if they are qualifying and instead simply transition based on the number of images/triggers taken irrespective of their content may be less computationally expensive than implementations that analyze images to determine if they are qualifying.

Current Activity

Some implementations may evaluate images (or video) just taken for short-term adjustments to any of picture/video resolution, number of pictures per trigger, length of video per trigger, or to temporarily transition from picture to video mode. For example, suppose the camera triggers a first time while in single picture mode at a relatively low resolution. The trail camera may analyze the picture as mentioned above to determine whether the image is a qualifying image, e.g., appears to have an animal. If so, the camera may transition to taking more pictures per trigger for a certain period of time, e.g., 3 pictures per trigger for the next 10 minutes before transitioning back to single picture mode. Alternatively, the camera may transition to video mode for the next 10 minutes, and/or increase the resolution of pictures/videos taken for the next 10 minutes. Note that some implementations may immediately begin taking further pictures or taking video after identifying a qualifying picture even without an additional trigger, a single trigger that results in a single qualifying picture may be sufficient to cause the controller to take more pictures or take video for a certain amount of time responsive to detecting a qualifying image, e.g., of a particular type of animal.

Motion Sensor Sensitivity Adjustment

As discussed below, techniques mentioned above for transitioning between time lapse/triggering mode and picture/video can also be applied in the context of adjusting sensitivity of the motion sensor, e.g., how large a signal/gradient is required to cause the motion sensor to trigger the controller to take picture(s) or video.

Ambient Light

As mentioned, flash activations may be relatively demanding in terms of energy usage, so when the light sensor inputs indicate sufficient ambient light is available to take pictures/video without use of the flash (e.g., daytime), higher motion sensitivity settings can be used so that relatively more pictures/videos are taken (e.g., because the camera may be more likely trigger due to wind). When the light sensor inputs indicate that there is no longer sufficient light (e.g., due to sunset) the controller can automatically transition the trail camera to a lower motion sensor sensitivity setting. This may result in fewer false triggers at night and thus conserve some battery power by preventing excessive flash activations.

Manually Based on Time of Day

Again, the transitions can also be based on time of day. In a manner similar to that discussed above, the controller can switch to a higher motion sensor sensitivity at particular times of day, e.g., from 5 PM to 6 PM and from 7 AM to 8 AM, and otherwise transition back to lower sensitivity settings at other times of day. Again, the controller may configured to adaptively change the times of day for the motion sensor sensitivity adjustment based on sunset and sunrise. Thus, the user may be able to configure the trail camera to increase motion sensor sensitivity at 30 minutes before sunrise and go back to a lower sensitivity setting one hour after sunrise. Once again, controller may adjust the time of day for each transition based on a sunrise/sunset table to follow changes in the sunrise. The controller may take similar actions for sunset. Similarly, the durations for sunset are not necessarily the same as for sunrise, e.g., the user could configure the controller to increase the motion sensor sensitivity 45 minutes before sunrise and go back to the lower motion sensor sensitivity setting at 15 minutes after sunset.

Wind Detection Via Ambient Noise

Some implementations may also employ a microphone to monitor ambient noise and adjust the sensitivity of the motion sensor based on the ambient noise. Generally, wind results in relatively sustained higher levels of sound, whereas animal sounds tend to occur in the vicinity of the camera for only short periods of time. Thus, when sounds captured by the microphone suggest that it is particularly windy, the motion sensor may be adjusted to a lower setting to reduce false triggers due to moving vegetation. Conversely, when the ambient noise quiets down, the motion sensor sensitivity may be increased. Note that some implementations may require a certain duration of increased ambient noise volume (or a moving average volume over a certain amount of time exceeding a threshold). This may avoid transitioning to the lower sensitivity setting due to noises made by an animal moving in the vicinity of the trail camera.

As also discussed above, volume is but one characteristic of sound that can be used to determine whether wind is responsible for ambient noise. Further implementations may use sound feature vectors and train a classifier (e.g., a neural network, support vector machine, nearest neighbor, etc.) to discern ambient wind noise vs. animal sounds. For example, labeled training examples of animal sounds and wind taken with the camera microphone can be used to extract sound feature vectors and train the classifier. In some cases, the classifier is trained on a different computing device and the trained classifier can be uploaded to the trail camera and used by the classifier to determine when given sounds are likely wind or animals (e.g., sounds of animals moving near the camera). When the classifier indicates that a sound received at the camera is wind, the controller may decrease the motion sensor sensitivity for a period of time (e.g., one hour, or until the ambient sound no longer is classified as wind). When the classifier indicates that sound received at the camera is an animal, the controller may increase the sensitivity for a period of time (e.g., 5 minutes, or until the ambient sound is no longer classified as an animal sound).

Weather Server

Other implementations may communicate via wireless (e.g., cellular) with a weather server or other computing device that provides weather conditions. The controller may use the current weather conditions to adjust the motion sensor sensitivity, e.g., increase the sensitivity if the current conditions are relatively still and decrease the sensitivity if the current conditions are relatively windy. For example, a wind velocity threshold may be employed (e.g., mph, either gusts or sustained) and velocities below the threshold cause the camera to operate in a normal motion sensor sensitivity setting and above the threshold in a reduced motion sensitivity setting. Similarly, other weather conditions can be mapped to particular sensitivity settings, e.g., switch to lower sensitivity during thunderstorms, snow showers, etc., and higher sensitivity settings otherwise (clear, cloudy, light rain).

As suggested above, sensitivity adjustments can also be performed responsive to observed values of local temperature/barometric pressure/humidity obtained from weather instruments on (or nearby and in communication with) the trail camera as well as responsive to weather data obtained from a remote device. For example, the user can define a particular temperature below (or above) which the camera should use high sensitivity, and low sensitivity at other temperatures. Alternatively, specific humidity and/or barometric pressure ranges can be defined for performing sensitivity adjustment Further, some implementations may use a combination of the instrument values, e.g., if temperature is above 40 degrees Fahrenheit, barometric pressure is falling faster than a predetermined rate, and humidity is at least 50%, then use high sensitivity, and otherwise low sensitivity (or vice versa). Various other suitable combinations of instrumentation values and specific mappings of motion sensor sensitivity can also be employed.

Historical Activity—Persistent Adjustment

Other implementations may adjust motion sensor sensitivity based on camera activity such as triggers/pictures/qualifying pictures. For example, the trail camera may initially be deployed at a lower sensitivity setting to prevent too many false triggers due to wind, moving vegetation etc. However, if insufficient activity is detected after a given amount of time, e.g., below a (perhaps user-configurable) threshold number of pictures or triggers taken within a predetermined amount of time, the controller can automatically switch the trail camera over to a higher sensitivity setting for the motion sensor.

In some cases, a user may be able to input certain criteria, e.g., 10 days and 100 pictures. The camera can be deployed at a relatively low motion sensor setting, and if 10 days go by with fewer than 100 (e.g., triggers/pictures/qualifying pictures) pictures taken over the 10 day period, the controller may automatically increase the motion sensor sensitivity. Alternatively, the camera can be deployed in a relatively high sensitivity setting, and if more than a threshold number of triggers/pictures/qualifying pictures are taken over a given time (e.g., 200 pictures in 10 days), the camera can transition to a lower sensitivity setting.

Historical Activity—Temporary Adjustment During Particular Time Period

When qualifying pictures/video are obtained sufficiently frequently at a given time of day over a period of time, the trail camera may perform a temporary adjustment so that the trail camera uses different settings only during that time of day. For example, suppose a user configures the trail camera to switch to higher sensitivity settings during a particular time period when two criteria are met: (1) at least two triggers/pictures/qualifying pictures are taken by the camera within a given half-hour period and (2) for at least 7 straight days. Now, suppose that between 10 and 10:30 AM the trail camera has taken at least two triggers/pictures/qualifying pictures every day for a week. In this case, the trail camera may automatically transition to a higher motion sensitivity setting at 10 AM every day for ½ hour, and go back to a lower sensitivity setting at other times. Also note that some implementations may only require that a particular number of triggers/pictures/qualifying pictures are taken over a given amount of time, e.g., 14 qualifying pictures within a week for any ½ hour period may be sufficient to cause the switch to higher sensitivity during that time period. In this case, the adjustment may occur even if one day has fewer than 2 triggers/pictures/qualifying pictures during the time period, so long as the total number of pictures is at least 14. The general idea here is that, if pictures of game animals tend to be taken at particular times of day, it can be worthwhile to increase sensitivity at that time of day since any triggers are less likely to be false triggers. Note that an alternative approach would be to reduce sensitivity settings during times of day when many non-qualifying pictures are taken, in other words reduce motion sensor sensitivity at times of day when there tend to be a lot of false triggers. Further implementations may use percentages of qualifying pictures or other statistical measures to determine which times of day to switch to lower/higher sensitivity settings.

As another example, some implementations may maintain a moving average of the number of triggers/pictures/qualifying pictures taken during time periods (e.g., each hour) of the day. The controller may transition the trail camera to higher sensitivity settings during time periods for which the moving average exceeds a threshold. As an example, if the threshold is 3 triggers/pictures/qualifying pictures per hour, and the moving average for 3-4 PM is 2.2 triggers/pictures/qualifying pictures, 3.2 triggers/pictures/qualifying pictures for 4-5 PM, and 2.8 triggers/pictures/qualifying pictures from 5-6 PM, then the adjustment to higher sensitivity could be performed at 4 PM and adjusted back to the lower sensitivity at 5 PM. Again, an alternative would be to reduce sensitivity at times of day when either very few qualifying pictures tend to be taken (moving average below a threshold) or when many false triggers occur (false triggers being identified when pictures/video are non-qualifying, e.g., are not classified as likely including an animal of interest).

Current Activity

Also, note that some implementations may evaluate images (or video) shortly after they are taken (e.g., within minute or less) for short-term sensitivity adjustment purposes. For example, suppose the camera triggers a first time on low sensitivity setting and the picture is classified as non-qualifying, e.g., does not appear to include an animal of interest. In this case, the camera may continue to operate in the low sensitivity setting. On the other hand, suppose the camera triggers a second time on the low sensitivity setting and the image is qualifying, e.g., is classified as having an animal of interest. The camera may transition to a higher sensitivity setting for predetermined period of time (e.g., 5 minutes). This may increase the likelihood of capturing pictures or video of the animal that triggered the camera or others traveling with the animal that caused the trigger in the vicinity of the trail camera for the short duration of time. A relatively short period of high sensitivity followed by a transition back to a lower sensitivity setting may be preferable leaving the camera at a high sensitivity setting indefinitely and potentially resulting in many false triggers.

Some implementations may employ an alternative where sensitivity is reduced when recent pictures are non-qualifying. For example, if a threshold number or percentage of nonqualifying pictures are taken in a given time period (e.g., the past hour), then motion sensor sensitivity can be reduced for a given amount of time (e.g., the next hour). For example, if at least 5 non-qualifying pictures are taken within an hour, sensitivity can be reduced for the next hour. As another example, if at least 60% of pictures taken within the past hour are nonqualifying, the sensitivity can be reduced for the next hour.

Flash Intensity Adjustment

As discussed below, the techniques mentioned above can also be applied in the context of adjusting the intensity of the flash (including both visible spectrum and/or infrared). Note that the following examples generally assume that the flash will not be used during the day unless otherwise specified.

Ambient Light

As mentioned, flash activations may be relatively demanding in terms of energy usage, so it can be useful to adjust the intensity of the flash so that the flash is not more intense than necessary. In addition, some flashes are visible to animals, and it can be beneficial to minimize the intensity of the flash to avoid spooking the animals. Consider a flash with three settings—flash off, flash low intensity, and flash high intensity. In some implementations, relatively high amounts of ambient light are mapped to a flash off setting—e.g., when the light sensor inputs indicate sufficient ambient light is available to take pictures/video without use of the flash (e.g., daytime). When the light sensor indicates that there are low light conditions (e.g., moonlight night, dusk, dawn), the high intensity flash can be used so that sufficient light is produced to illuminate animals relative to their background. When the light sensor indicates that there are very low light conditions (e.g., nearly complete darkness), the low intensity flash can be used because it may be sufficient to illuminate animals relative to the very dark background in these conditions. Thus, consider a light sensor with a percentage output relative to the dynamic range of the light sensor (e.g., a current or voltage output). Here, there may be three corresponding light thresholds, e.g., 50-100% of maximum light sensor output results in no flash, 20-50% of maximum light sensor output may result in high intensity flash, and 0-20% of maximum light sensor output results in low intensity flash.

Manually Based on Time of Day

As mentioned, flash activations may be relatively demanding from a power consumption perspective. On the other hand, the flash needs to be strong enough to effectively illuminate animals. In a manner similar to that discussed above, the controller can use no flash during daytime hours, switch to high flash intensity at particular times of day, e.g., from 7 PM to 8 PM and from 5 AM to 6 AM, and at other times of night transition to low flash intensity. Again, the controller may configured to adaptively change the times of day for the flash intensity adjustment based on sunset and sunrise. Thus, the user may be able to configure the trail camera to use a high flash intensity for the first 90 minutes after sundown (e.g., 7-8:30 μm) and the 90 minutes before sunrise (e.g., 4:30-6 AM), use low flash intensity between these times at night (e.g., 8:30 PM-4:30 AM), and use no flash between these times during the day (e.g., 6 AM-7 PM). Once again, controller may adjust the time of day for each transition based on a sunrise/sunset table to follow changes in the sunrise. The controller may take similar actions for sunset. Similarly, the durations for sunset are not necessarily the same as for sunrise, e.g., the user may configure a longer period of high flash intensity after sundown than before sunrise, or vice versa.

Based on Weather

Some implementations may also employ a microphone to monitor ambient noise and adjust the flash intensity based on the ambient noise. As noted above, wind tends to cause false triggers and it can be particularly wasteful to use high intensity flash in windy conditions, as this can drain the batteries. Thus, when sounds captured by the microphone suggest that it is particularly windy, the flash intensity can be decreased to avoid wasting too much battery power at these times. Conversely, when the ambient noise quiets down, the flash intensity may be increased, since each trigger is more likely to actually be due to an animal. Note that some implementations may require a certain duration of increased noise (or a moving average over a certain amount of time exceeding a threshold). This may avoid transitioning to lower flash intensities due to noises made by an animal moving in the vicinity of the trail camera.

As also discussed above, volume is but one characteristic of sound that can be used to determine whether wind is responsible for ambient noise. Further implementations may use sound feature vectors and train a classifier (e.g., a neural network, SVM, nearest neighbor, etc.) to discern ambient wind noise vs. animal sounds. For example, labeled training examples of animal sounds and wind taken with the camera microphone can be used to extract sound feature vectors and train the classifier. The trained classifier can be uploaded to the trail camera and used by the classifier to determine when given sounds are likely wind or animals (e.g., sounds of animals moving near the camera). When the classifier indicates that a sound received at the camera is likely due to wind, the controller may decrease flash intensity for a period of time (e.g., one hour, or until the ambient sound no longer is classified as wind). When the classifier indicates that sound received at the camera is likely due to an animal, the controller may increase the flash intensity for a period of time (e.g., 5 minutes, or until the ambient sound is no longer classified as an animal sound).

Weather Server

Other implementations may communicate via wireless (e.g., cellular) with a weather server or other computing device that provides weather conditions. The controller may use the current weather conditions to adjust the flash intensity, e.g., increase the intensity if the current conditions are relatively still and decrease the intensity if the current conditions are relatively windy. For example, a wind velocity threshold may be employed (e.g., mph, either gusts or sustained) and velocities below the threshold cause the camera to operate in a high flash intensity setting and above the threshold in a low flash intensity setting. Similarly, other weather conditions can be mapped to particular intensity settings, e.g., switch to lower intensity during thunderstorms, snow showers, etc., and higher intensity settings otherwise (clear, cloudy, light rain).

As suggested above, flash intensity adjustment can also be performed responsive to observed values of local temperature/barometric pressure/humidity instrumentation. For example, the user can define a particular temperature below (or above) which the camera should use high flash intensity. Alternatively, specific humidity and/or barometric pressure ranges can be defined for using high flash intensity (or low flash intensity, etc.). Further, some implementations may use a combination of the instrument values, e.g., if temperature is above 40 degrees Fahrenheit, barometric pressure is falling faster than a predetermined rate, and humidity is at least 50%, then use high flash intensity, and otherwise use low flash intensity (or vice versa). Various other suitable combinations of instrumentation values and specific flash intensity values can also be employed.

Historical Activity—Persistent Adjustment

As also discussed above, some implementations may adjust flash intensity based on camera activity such as triggers/pictures/qualifying pictures. For example, the trail camera may initially be deployed at a low flash intensity setting to save battery power and avoid spooking game. However, if insufficient activity is detected after a given amount of time (e.g., too few pictures taken within a predetermined amount of time), the controller can automatically switch the trail camera over to a higher flash intensity setting. The idea here is that, since fewer overall pictures are being taken, the camera can "afford" to use an intense flash.

Also, because relatively few pictures are being taken, it is undesirable to "waste" pictures by not using sufficient flash intensity to capture animals that may be relatively far away from the camera. In some cases, a user may be able to input certain criteria, e.g., a number of days and a picture threshold over the number of days Assume the user selects 10 days and 100 pictures. If 10 days go by with fewer than 100 pictures taken, the controller may automatically transition the camera to a higher flash intensity setting. Alternatively, the camera can be deployed in a relatively high intensity setting, and if more than a threshold number of pictures are taken over a given time (e.g., 200 pictures in 10 days), the camera can transition to a lower intensity setting.

Historical Activity—Temporary Adjustment During Particular Time Period

Other implementations may adjust flash intensity based on camera activity during specific time periods. For example, the trail camera may initially be deployed at a lower intensity setting to prevent using too much battery power via false triggers due to wind, moving vegetation etc. However, if insufficient activity is detected after a given amount of time, e.g., below a (perhaps user-configurable) threshold number of pictures taken within a predetermined amount of time, the controller can automatically switch the trail camera over to a higher intensity setting for the flash. In some cases, a user may be able to input certain criteria, e.g., 10 days and 100 pictures. The camera can be deployed at a relatively low flash intensity setting, and if 10 days go by with fewer than 100 (e.g., qualifying) pictures taken over the 10 day period, the controller may automatically increase the flash intensity sensitivity. Alternatively, the camera can be deployed in a relatively high flash intensity setting, and if more than a threshold number of pictures are taken over a given time (e.g., 200 pictures in 10 days), the camera can transition to a lower flash intensity setting.

Suppose a user configures the trail camera to switch from a low flash intensity to a high flash intensity setting during a particular time period when two criteria are met: (1) at least two qualifying pictures (or without regard to image content) are taken by the camera within a given half-hour period and (2) for at least 7 straight days. Now, suppose that between 10 and 10:30 PM the trail camera has taken at least two (e.g., qualifying) pictures every day for a week. In this case, the trail camera may automatically transition to a higher flash intensity setting at 10 PM every day for ½ hour, and go back to a lower flash intensity setting at other times. Also note that some implementations may only require that a particular number of qualifying pictures are taken over a given amount of time, e.g., 14 qualifying pictures within a week for any ½ hour period may be sufficient to cause the switch to higher intensity during that time period. In this case, the adjustment may occur even if one day has fewer than 2 qualifying pictures during the time period, so long as the total number of pictures is at least 14. The general idea here is that, if pictures of game animals tend to be taken at particular times of day, it can be worthwhile to increase intensity at that time of day since any triggers are less likely to be false triggers. Note that an alternative approach would be to reduce intensity settings during times of day when many non-qualifying pictures are taken, in other words reduce intensity at times of day when there tend to be a lot of false triggers. Further implementations may use percentages of qualifying pictures or other statistical measures to determine which times of day to switch to lower/higher intensity settings.

As another example, some implementations may maintain a moving average of the number of qualifying pictures taken during time periods (e.g., each hour) of the day. The controller may transition the trail camera to higher intensity settings during time periods for which the moving average exceeds a threshold. As an example, if the threshold is 3 qualifying pictures per hour, and the moving average for 8-9 PM is 2.2 qualifying pictures, 3.2 qualifying pictures for 9-10 PM, and 2.8 qualifying pictures from 10-11 PM, then the adjustment to higher intensity could be performed at 9 PM and adjusted back to the lower intensity at 10 PM. Again, an alternative would be to reduce intensity at times of day when either very few qualifying pictures tend to be taken (moving average below a threshold) or when many false triggers occur (false triggers being identified when pictures/video are nonqualifying, e.g., are not classified as likely including an animal of interest).

Current Activity

Also, note that some implementations may evaluate images (or video) shortly after they are taken for short-term intensity adjustment purposes. For example, suppose the camera is deployed in a high intensity setting and triggers a first time, and the picture is classified as non-qualifying, e.g., does not appear to include an animal of interest. In this case, the camera may continue to operate in the high intensity setting. On the other hand, suppose the camera triggers a second time on the high intensity setting and the image is qualifying, e.g., is classified as having an animal of interest. The camera may transition to a lower intensity setting for predetermined period of time (e.g., 5 minutes). This may reduce the likelihood of spooking the animal with subsequent flashes. Alternatively, the camera may be deployed in a low intensity setting and transitioned to a high intensity setting responsive to identifying an animal in a picture.

Alternatively, suppose the camera is deployed in a low intensity setting and triggers and the picture is classified as non-qualifying, e.g., is mostly black or has insufficient range of brightness. In this case, the camera may transition to a high intensity setting in the hopes of capturing a better (brighter) picture of the animal. On the other hand, suppose image is qualifying, e.g., the animal is discernible in the picture according to the classifier. In this case, the camera may remain in the low intensity setting since the flash is evidently sufficient, and this may help avoid spooking the animal.

Some implementations may employ an alternative where intensity is increased when recent pictures are non-qualifying. For example, if a threshold number or percentage of nonqualifying pictures are taken in a given time period (e.g., the past hour), then intensity can be increased for a given amount of time (e.g., the next hour). For example, if at least 5 nonqualifying pictures are taken within an hour, intensity can be increased for the next hour, to provide brighter pictures that hopefully show animals therein. As another example, if at least 60% of pictures taken within the past hour are non-qualifying, the intensity can be increased for the next hour. As an alternative, the intensity can be decreased instead of increased under these same criteria in an effort to preserve battery power. The idea here is that if a high intensity flash is still not capturing qualifying images, they may be the result of false triggers and it does not make sense to keep wasting battery power.

H. Based on Motion Sensor Intensity

In some implementations, the intensity of the flash can be a function of the motion sensor input. A relatively stronger motion sensor signal (e.g., higher gradient) may suggest an animal is relatively close to the camera, and thus the controller may cause the flash to illuminate at a relatively low intensity. Conversely, a relatively weak motion sensor signal may result in the controller causing the flash to operate at high intensity. Some implementations may maintain a mapping of motion sensor signal gradients to flash intensities, e.g., low gradient==high intensity flash, medium gradient==medium intensity flash, high gradient==low intensity flash.

Other implementations may take an opposite approach and use a higher intensity flash for higher gradients. The idea here is that the stronger motion sensor signal is less likely to be a false trigger, so it makes sense to use a stronger flash. In this case, the mapping might be low gradient==low intensity flash, medium gradient==medium intensity flash, high gradient==high intensity flash. To some extent, these mappings can be a function of user preferences or available resources, e.g., the availability of battery power.

View Angles

In some implementations, the camera may be configured to take pictures at multiple different angles, e.g., the trail camera can have multiple lenses pointed in different directions or a moveable lens that the controller moves to take pictures at different angles. In some cases, multiple different pictures can be obtained from each angle and combined to create a panoramic image. Alternatively, the individual images from the different angles can be left as separate images. In either case, having images from different angles can be useful for capturing animals that have moved out of one of the viewing angles.

Ambient Light

In some cases, the trail camera can be configured to switch between a multi-angle mode (taking pictures at multiple angles) or a single angle mode (taking pictures at a single angle, e.g., using only one lens). As mentioned, flash activations drain battery power. Thus, some implementations control the trail camera based on a light sensor. When the light sensor inputs indicate sufficient ambient light is available to take pictures without use of the flash (e.g., daytime), the multi-angle mode can be used. When the light sensor inputs indicate that there is no longer sufficient light (e.g., due to sunset) the controller can automatically transition the trail camera to the single angle mode. Likewise, the controller can automatically transition the camera back to multi-angle mode the next time there is sufficient light (e.g., due to sunrise). Some implementations may provide the user with three different settings, e.g., multi-angle setting, single-angle setting, or multi-angle day and single-angle night setting. In some cases, the single angle setting uses a user-specified angle or can otherwise use a default angle (e.g., the center angle in a camera with left-center-right angles or high-center-low).

Manually Based on Time of Day

Further implementations may transition to different angles based on time of day. Some game animals tend to move in one direction during morning hours and in the opposite direction during late evening hours. Thus, in some implementations, the controller can specify to use a single angle (such as facing uphill to catch animals moving down to feeding grounds) e.g., from 5 PM to 6 PM and to another angle (such as facing downhill to catch animals moving uphill to daytime bedding grounds) from 7 AM to 8 AM. At other times, pictures/video may be taken at all angles on each trigger instead of only from a single angle. Further implementations may specify particular times of day to use multiple angles and otherwise default to only a single (e.g., user-selected) angle. As discussed previously, these times can be specified either in hours of day or relative to sunrise/sunset.

Wind Detection Via Ambient Noise

Some implementations may also use different angle settings in the presence of excessive wind, which can cause false motion sensor triggers. For example, some implementations may employ a microphone to monitor ambient noise and transition to single or multi-angle mode based on the ambient noise. Generally, wind results in relatively sustained higher levels of sound, whereas animal sounds tend to occur in the vicinity of the camera for only short periods of time. Thus, when sounds captured by the microphone suggest that it is particularly windy, the controller may transition the camera to single angle mode. Conversely, when the ambient noise quiets down, the controller may transition the camera to multi-angle mode. The basic idea here is to avoid taking pictures at each angle in high wind conditions, since these are more likely to be false triggers and this can waste storage space (as well as excessive battery usage, particularly if each angle has a separate flash). Note that some implementations may require a certain duration of increased volume (or a moving average volume over a certain amount of time exceeding a threshold), as discussed above.

As also discussed above, volume is but one characteristic of sound that can be used to determine whether wind is responsible for ambient noise. Further implementations may use sound feature vectors and train a classifier (e.g., a neural network) to discern ambient wind noise vs. animal sounds. For example, labeled training examples of animal sounds and wind taken with the camera microphone can be used to extract sound feature vectors and train the classifier. The trained classifier can be uploaded to the trail camera and used by the classifier to determine when given sounds are likely due to wind or, alternatively, likely due to animals (e.g., sounds of animals moving near the camera). When the classifier indicates that a sound received at the camera is likely due to wind, the controller may transition to single angle mode for a period of time (e.g., one hour, or until the ambient sound no longer is classified as likely due to wind). When the classifier indicates that sound received at the camera is likely due an animal, the controller may stay in, or transfer to, the multi-angle mode.

Further implementations may detect a particular angle at which a sound classified as an animal sound is received from and only use that angle to take images. In other words, techniques used to determine the direction from which the sound occurs can be used to select the particular viewing angle. Further implementations may have multiple motion sensors, e.g., one per viewing angle, and the particular viewing angle that is used for a given trigger may be based on the corresponding motion sensor that generated the trigger. In still further implementations, both directional sound techniques and motions sensor selectivity can be applied.

Weather Server

In other implementations, the trail camera may communicate via wireless (e.g., cellular) with a weather server or other computing device that provides weather conditions for the current location of the camera (e.g., as determined by a GPS device on the camera or a location uploaded from a smartphone to the camera). The controller may use the current weather conditions to determine whether to transition between single and multi-angle modes, e.g., multi-angle when the current conditions are relatively still and single angle when the current conditions are relatively windy. For example, a wind velocity threshold may be employed (e.g., mph, either gusts or sustained) and velocities below the threshold cause the camera to operate in multi-angle mode and above the threshold in single-angle mode. Similarly, other weather conditions can be mapped to particular modes, e.g., switch to single-angle mode during thunderstorms, snow showers, etc., and multi-angle mode otherwise (clear, cloudy, light rain). Other implementations may select a particular viewing angle to use in single-angle mode based on weather conditions, e.g., use a leftmost viewing angle during rainy conditions, a center viewing angle during windy conditions, etc.

As suggested above, selectively using different viewing angles can also be performed responsive to observed values of local temperature/barometric pressure/humidity obtained from local instruments on the camera as well as from remotely-obtained weather data. For example, the user can define a particular temperature below (or above) which the camera should use all viewing angles, a particular viewing angle, etc. Alternatively, specific humidity and/or barometric pressure ranges can be defined for when all viewing angles should be used and other ranges when only specified viewing angles should be used. Further, some implementations may use a combination of the instrument values, e.g., if temperature is above 40 degrees Fahrenheit, barometric pressure is falling faster than a predetermined rate, and humidity is at least 50%, then use all viewing angles, and otherwise use only a single viewing angle (or vice versa). Various other suitable combinations of instrumentation values and specific viewing angle activations can also be employed.

Historical Activity—Persistent Adjustment

Other implementations may perform persistent transitions between single and multi-angle mode based on camera activity. For example, the trail camera may initially be deployed in the single angle mode. However, if recent activity has been insufficient, e.g., relatively few (e.g., qualifying) pictures taken in a given amount of time, the controller can automatically switch the trail camera over to multi-angle mode (e.g., all day, only during daylight hours, etc.). In some cases, a user may be able to input certain criteria, e.g., 10 days and 100 pictures. If 10 days go by with fewer than 100 (e.g., qualifying) pictures taken over the 10 day period, the controller may automatically transition the camera to multi-angle mode.

When a threshold number of qualifying pictures are obtained over time from a particular view angle, the trail camera may switch to single angle mode using that view angle. For example, suppose the user specifies a threshold of 10 qualifying pictures over the course of three days for transitioning to a single angle mode. Now suppose the camera triggers 15 times over 3 days using the multi-angle mode with three angles, a center angle directly in front of the camera, another angle to the left of the center angle, and another angle to the right of the camera. Thus, a total of 45 pictures are taken. Further suppose that 12 of the pictures are qualifying pictures that appear to have animals in them, and 11 of these were taken at the left angle. In this case, the number of pictures taken at the left angle exceeds the threshold. Thus, the controller may cause the camera to switch to the single angle mode using the left angle. In other words, the controller selects a particular angle to use based on animal activity detected at that angle. Further implementations may specify a threshold percentage instead, e.g., of the first 100 qualifying pictures taken, if at least 80% are from a particular viewing angle, e.g., in multi-angle mode, the camera may switch to that viewing angle in single-angle mode. The general idea here is to avoid staying in multi-angle mode when most of the pictures taken at certain angles are not of interest to the user, and instead conserve battery/storage resources for the individual viewing angle that is most likely to take pictures of interest. In some cases, motion sensors for other viewing angles can be turned off when transitioning from multi-angle to single angle mode.

Historical Activity—Temporary Adjustment During Particular Time Period

When qualifying pictures/video are obtained sufficiently frequently at a given time of day over a period of time, the trail camera may perform a temporary adjustment so that the trail camera uses different settings only during that time of day. For example, suppose a user configures the trail camera to switch to multi-angle mode during a particular time period when two criteria are met: (1) at least two qualifying pictures are taken by the camera within a given half-hour period and (2) for at least 7 straight days. Now, suppose that between 10 and 10:30 AM the trail camera has taken at least two (e.g., qualifying) pictures every day for a week. In this case, the trail camera may automatically transition to multi-angle mode at 10 AM every day for ½ hour, and go back to single angle mode at other times. Also note that some implementations may only require that a particular number of qualifying pictures are taken over a given amount of time, e.g., 14 qualifying pictures within a week for any ½ hour period may be sufficient to cause the switch to multi-angle mode during that time period. In this case, the adjustment may occur even if one day has fewer than 2 qualifying pictures during the time period, so long as the total number of pictures is at least 14. In the alternative, the camera can be deployed in multi-angle mode and switched to single angle mode for periods of time that fall below a threshold number of pictures over time.

As another example, some implementations may maintain a moving average of the number of qualifying pictures taken during time periods (e.g., each hour) of the day. The controller may transition the trail camera to multi-angle mode during time periods for which the moving average exceeds a threshold. As an example, if the threshold is 3 qualifying pictures per hour, and the moving average for 3-4 PM is 2.2 qualifying pictures, 3.2 qualifying pictures for 4-5 PM, and 2.8 qualifying pictures from 5-6 PM, then the adjustment to multi-angle mode could be performed at 4 PM and adjusted back to the single angle mode at 5 PM. In the alternative, the camera can be deployed in multi-angle mode and switched to single angle mode for periods of time that fall below a threshold average number of pictures.

If such pictures are obtained sufficiently frequently at a given time of day from a particular view angle, the trail camera may switch to taking single pictures at that view angle that time of day. For example, suppose the camera triggers 15 times over 3 days between 2 and 2:30 PM using the multi-angle mode with three angles, a center angle directly in front of the camera, another angle to the left of the center angle, and another angle to the right of the camera. Thus, a total of 45 pictures are taken. Further suppose that 12 of the pictures appear to have animals in them, and 11 of these were taken at the left angle. The controller may cause the camera to switch to the single angle mode using the left angle at 2:00 PM every day until 2:30 PM. In other words, the controller selects a particular angle to use based on animal activity detected at that angle for that particular time period. At other times, the camera can use the multi-angle mode.

Current Activity

Some implementations may evaluate images (or video) shortly after they are taken for short-term adjustments to/from single/multi-angle mode. For example, suppose the camera triggers a first time in single angle mode and the image is analyzed by a classifier trailed to recognize certain animals (e.g., deer generally, adult male deer, etc.). If the image is deemed qualifying, the camera may transition to the multi-angle mode for the next 5 minutes and then transition back to single angle mode. Alternatively, the camera evaluate images taken in the multi-angle mode and decide, in some instances, to transition to the single angle mode for five minutes and use only the angle that took the qualifying images. For example, if a qualifying picture is taken at the right view angle and the left and center view angles both have non-qualifying pictures, the camera may immediately transition to single angle mode for the right view angle for five minutes.

Combining Adjustment Settings

In the examples set forth above, each adjustment made by the controller was to a single setting, e.g., low ambient light could be used as a criteria for transitioning from time lapse to triggering mode, from video to picture mode, etc. In further implementations, combinations of the above can be employed, e.g., low ambient light can cause the controller to do both—switch from time lapse to triggering mode and from video mode to picture mode. In other words, during periods of daylight the camera would take a video at each predetermined time interval (e.g., a 15 second video every 5 minutes) and during periods of nighttime the camera would take a picture for each motion sensor trigger. Note that other combinations can also be selected, e.g., some implementations may use ambient light as a criteria for various combinations of selecting from video/triggering mode, picture/video mode, number of pictures/length of video, picture/video resolution, adjusting motion sensor sensitivity, adjusting flash intensity, and/or selecting which/how many view angles are used. For example, the trail camera may be configured to operate in time lapse mode with videos taken at high resolution during bright conditions (e.g., ambient light above a first threshold), triggering mode with high motion sensor sensitivity and high intensity flash taking videos at medium resolution during moderately bright (e.g., twilight) conditions (e.g., ambient light below the first threshold and above a second threshold), and triggering mode with low motion sensor sensitivity and low intensity flash taking pictures taken at low resolution during dark conditions (e.g., ambient light below the second threshold).

In addition to ambient light levels, other criteria discussed above for performing various adjustments include criteria reflecting user manually configured times, criteria based on weather (e.g., as determined based on ambient noise, received weather data, or weather measurements taken by local instruments of the trail camera), criteria based on historical activity (e.g., persistent adjustments or adjustments at specific times of day) or criteria based on current activity (e.g., very recently-taken images). For example, consider manual configuration of settings at a particular time. Instead of using ambient light as mentioned above, users may select certain settings to use at specific times of day. Taking the previous example, a user may decide between the hours of 8 AM and 6 PM to use time lapse mode with videos taken at high resolution, between 7 and 8 AM and between 6 PM and 7 PM to use triggering mode with high motion sensor sensitivity and high intensity flash taking videos at medium resolution, and between 7 PM and 7 AM to use triggering mode with low motion sensor sensitivity and low intensity flash taking pictures at low resolution. As also discussed above, the camera can be configured to perform these adjustments at times that change relative to sunrise/sunset, e.g., from ½ hour after sunrise until ½ hour before sunset use time lapse mode with videos taken at high resolution, from ½ hour before sunrise until ½ hour after sunrise and ½ hour before sunset to ½ hour after sunset use triggering mode with high motion sensor sensitivity and high intensity flash taking videos at medium resolution, and between ½ hour after sunset and ½ hour before sunrise use triggering mode with low motion sensor sensitivity and low intensity flash taking pictures taken at low resolution. Again, predefined values of local temperature, barometric pressure, and/or humidity can also be used to trigger combinations of adjustments using weather server data or local instruments of the trail camera.

As another example, consider configuration of settings based on ambient noise, as already discussed for individual settings. Taking the previous example, a user may decide that, under high ambient noise conditions (e.g., high wind) to use time lapse mode with videos taken at high resolution, at moderate noise levels (e.g., moderate wind) to use triggering mode with medium motion sensor sensitivity and medium intensity flash, and at low noise levels (e.g., still days) to use triggering mode with high motion sensor sensitivity and high intensity flash. Again, instead of using ambient noise measured at the trail camera, these settings can be mapped to various weather patterns, e.g., using the settings discussed above for high wind when a weather server indicates sustained winds over 20 mph, the medium wind settings when the weather server indicates sustained winds between 10 and 20 mph, and using the low wind settings for winds below 10 mph. Again, multiple configuration settings can also be defined for other weather data. For example, the controller may increase both flash intensity and motion sensor sensitivity when barometric pressure is dropping, since this may make animals more likely to move. As another example, the controller may decrease motion sensor sensitivity and increase resolution when the weather data indicates it is raining and foggy at the trail camera location, the general idea here is to prevent rain from triggering the camera and also to provide higher resolution pictures since they may be partially obscured by fog.

As another example, consider persistent changes to multiple settings that may take place when certain conditions are met. For example, the trail camera may initially be deployed in the triggering mode at high resolution. However, if recent activity has been insufficient, e.g., relatively few (e.g., qualifying) pictures taken in a given amount of time, the controller can automatically switch the trail camera over to time lapse mode (e.g., all day, only during daylight hours) at a lower resolution. In some cases, a user may be able to input certain criteria, e.g., 10 days and 100 pictures. If 10 days go by with fewer than 100 (e.g., qualifying) pictures taken over the 10 day period, the controller may automatically transition the camera from triggering/high resolution to time lapse/low resolution. The general idea here is that if the camera is seeing sufficient game animals then it makes sense to stay in the triggering mode and capture quality pictures. Otherwise, it may make more sense to use the time lapse mode to take more total pictures at lower resolution and then subsequently the user, trail camera, or other device can analyze the pictures to determine which pictures may have game animals shown therein.

As another example, when qualifying pictures/video are obtained sufficiently frequently at a given time of day over a period of time, the trail camera may temporarily adjust multiple settings for a particular time of day. For example, suppose a user configures the trail camera so that it is deployed in the triggering/picture mode at low resolution with low motion sensor sensitivity but is configured to switch to high resolution and high motion sensor sensitivity for a particular time period when two criteria are met: (1) at least two qualifying pictures are taken by the camera within a given half-hour period and (2) for at least 7 straight days. Now, suppose that between 10 and 10:30 AM the trail camera has taken at least two (e.g., qualifying) pictures every day for a week. In this case, the trail camera may automatically transition to high resolution and high motion sensor sensitivity for just those times. Again, other implementations may control other combinations of particular settings at particular times depending on pictures taken by the camera on previous days at those times.

As also discussed above, some implementations may evaluate images (or video) just taken for short-term adjustments to various settings, and this technique can be used to adjust multiple settings at once. For example, suppose the camera triggers a first time in triggering mode, one picture per trigger, low resolution, and low flash intensity. Suppose this image (or images) is analyzed by a classifier trailed to recognize certain animals (e.g., deer generally, adult male deer, etc.). If the image is deemed qualifying, the camera may immediately transition to high resolution, six pictures per trigger, and high flash intensity. Again, multiple other combinations of settings can be adjusted depending on the content of recently-taken pictures.

Storage Constraints

In further implementations, certain camera settings may be adjusted based on an amount of data used to store images taken by the camera. For example, the camera can transition from video to picture mode when a (e.g., user-configurable) threshold on the amount of data is reached (e.g., specified as x % of the storage capacity, in gigabytes, etc.). For example, suppose the user specifies to transition to picture mode at 50% capacity. If the trail camera has a 16 gig SD card, the transition occurs when 8 gigs of images are stored, if the camera has an 8 gig SD card, the transition occurs when 4 gigs are stored, and so on. Note that this can also work where the video mode is only operable during some times of day, e.g., between certain hours and at all other times video mode is operable irrespective of storage constraints. Once the storage reaches the set capacity threshold, the camera can begin using picture mode during those times and continue using video mode at other times. Note also that analogous steps can be taken with respect to the number of pictures taken, e.g., 6 pictures per trigger until 50% capacity is used, then switching to 3 pictures per trigger until 75% storage capacity is used, and then 1 picture per trigger until the SD card is full. Again, this is true even when multiple pictures are only operable during certain times of day, e.g., from 0-50% full the controller takes 6 pictures per trigger for two hours a day and single picture at other times, from 51-75% full 3 pictures per trigger for the two hours per day and a single picture at the other times, and from 76-100% full only single picture mode is used. In a similar manner, relatively longer videos can be taken when capacity is higher and the length of the videos can be shortened as capacity decreases. Likewise, picture/video resolution can be reduced when certain storage capacity thresholds are met. In addition, in the time lapse mode, the intervals at which pictures/video are taken can be reduced as storage capacity is used, e.g., the time lapse intervals can be one minute for the first 50% of storage capacity, two minutes for the next 25% of storage capacity, and five minutes for the last 25% of storage capacity. Furthermore, motion sensor sensitivity can also be decreased as storage capacity is used up, e.g., high sensitivity for the first 50% of storage capacity, medium sensitivity for the next 25%, and low sensitivity for the last 25%.

Note also that combinations of the above can be performed when given storage capacity thresholds are met, examples including: (A) in triggering mode, reducing resolution, reducing motion sensor sensitivity, and reducing the number of pictures taken per trigger (or reducing video length) as storage capacity is used up, (B) in time lapse mode, reducing resolution and increasing time intervals between pictures/video, (C) starting in time lapse/video mode, transitioning to picture/triggering mode and also reducing resolution, as well as various other combinations.

Battery Constraints

In a manner similar to that specified above for remaining storage space, certain camera settings may be adjusted based on an amount of remaining battery power. Generally, the following steps can be taken as remaining battery power decreases: transitioning from triggering mode to time lapse mode, reducing the number of pictures/length of video taken per trigger, reducing motion sensor sensitivity, and reducing flash intensity. For example, the camera can perform any of the aforementioned steps when a (e.g., user-configurable) threshold on the amount of remaining battery power is reached (e.g., specified as x % of the remaining battery power). In addition, multiple thresholds are possible, e.g., high sensitivity motion sensor for the first 33% of battery power, medium sensitivity for the next 33%, and low sensitivity for the last 34%, high/medium/low resolution at these corresponding battery levels, 6/3/1 pictures per trigger at these corresponding battery levels, 20/10/5 second video per trigger or time lapse interval at these corresponding battery levels, high/medium/low flash intensity at these corresponding battery levels, etc.

Note also that combinations of the above can be performed when given remaining battery capacity thresholds are met, examples including: (A) in triggering mode, reducing motion sensor sensitivity and the number of pictures taken per trigger (or reducing video length) as battery capacity is used up, (B) in time lapse mode, increasing time intervals between image capture and switching from capturing video to pictures as battery capacity is used up, (C) starting in time lapse/video mode, transitioning to picture/triggering mode and also reducing flash intensity, as well as various other combinations.

User-Configured Return Time

In some implementations, the user may be able to input a designated return time that generally allows the controller to optimize/improve battery and/or storage usage. The general idea is to try to use up most or all of the available battery power and/or storage without running out of either resource before the user returns to retrieve the trail camera. To that end, the controller can perform various configuration adjustments to achieve these ends.

Storage

Considering storage capacity first, the trail camera may periodically determine how much available storage space is available, a rate at which the trail camera is using the storage, and then adjust settings to target using most of the remaining storage, but perhaps not all, prior to the return date. For example, suppose a trail camera is deployed and the user indicates an intention to return in 100 days via one or more user inputs. Now, in the first 10 days, suppose the trail camera is in picture/triggering mode with 6 pictures per trigger, and after 10 days 20% of available storage have been used. At this rate, the trail camera will use up all of the storage after only 50 days. Thus, the trail camera may make some adjustments that tend to cause the camera to use less storage on average. For example, the trail camera may (1) reduce the number of pictures taken per trigger, (2) reduce the resolution of pictures being taken, (3) reduce the motion sensor sensitivity to cause fewer pictures to be taken, and/or (4) in cases where the camera has multiple view angles, reduce the number of view angles being used to take pictures. Alternatively, the controller can take opposite steps if the trail camera is using storage more slowly (e.g., 5% after first 10 days) by (1) increasing pictures per trigger, (2) increasing resolution, (3) increasing motion sensor sensitivity, and/or (4) increasing the number of view angles used.

The previous examples are also applicable to video mode, e.g., adjustments to increase/decrease video resolution or length can be applied to target optimal usage of storage capacity relative to a preconfigured return date just as discussed above with respect to pictures. Additionally, in time lapse mode, time lapse intervals may be determined as a function of the return date, e.g., determining an interval between time lapse intervals that results in using most of the storage capacity prior to the return date without using all of the storage capacity too soon in advance of the return date. Some implementations may also switch from time lapse to triggering mode at some point to reduce the rate of data storage.

Some implementations may periodically check the current storage capacity usage and adjust any of the aforementioned settings to adjust the rate of storage usage. For example, each time the camera is triggered, the camera may evaluate the current rate of storage relative to some fixed target (e.g., target using 90% of storage by the return date to provide a 10% buffer). Alternative implementations may calculate the rate of usage and perform the aforementioned adjustments less often, e.g., once per day, once per week, etc.

Note also that some implementations may quantify the amount of data usage as a function of the aforementioned settings to estimate the data rate for a given group of settings. For example, suppose (1) the trail camera, on average, takes twice as many pictures on high sensitivity motion sensor settings than on low motion sensor sensitivity settings, (2) taking 3 pictures per trigger uses 50% as much storage as six pictures per trigger, and (3) a low resolution setting uses 50% as much storage per picture as a high resolution setting. Further, suppose the trail camera has been using 100 MB per day when deployed at high sensitivity, six pictures per trigger, and high resolution. The trail camera can expect to use approximately 50 MB per day (half the storage usage rate) by doing any one of the following: (1) switching from high to low sensitivity, (2) switching from 6 to 3 pictures per trigger, or (3) switching from high to low resolution. Any two of the aforementioned changes should result in even lower (e.g., 25 MB per day or ¼ the storage usage rate) usage, and all three should result in approximately 12.5 MB per day (⅛ rate) storage usage.

As a different numerical example, assume the trail camera has been deployed for 50 days at high sensitivity, 6 pictures per trigger, and high resolution pictures. Now, assume the trail camera has used 750 MB of 1000 MB available storage, e.g., 15 MB per day. Now, there are 250 MB remaining and 50 more days of expected deployment. Leaving a 10% buffer of 100 MB, the trail camera can target using 150 more MB in the remaining 50 days, e.g., a usage rate of 150/50=3 MB per day. In this case, all three adjustments may be necessary to adjust the storage usage rate enough to meet the 3 MB per day target.

Assume instead the trail camera has only been deployed for 10 days before the calculations/adjustment(s) are performed, and has used 150 MB in the first 10 days, i.e., 15 MB per day. Now, given 90 days of remaining expected deployment and 750 remaining usable MB (leaving 100 MB buffer), it may not be necessary to make all of the aforementioned adjustments. Rather, any one of the aforementioned adjustments should result in using only 7.5 MB per day, which in 90 days would be expected to use 675 MB. So, the trail camera may perform only one of the aforementioned adjustments.

In some cases, users may be able to prioritize or rank various criteria that are used by the controller to perform the aforementioned adjustments. For example, suppose the user ranks getting many triggers first (e.g., sensitivity), getting many pictures per trigger second, and picture resolution third. In this case, at the 10 day mark in the previous example, the controller can simply use the lowest-ranked criteria to adjust the camera, e.g., lower the resolution only while retaining high sensitivity and six pictures per trigger (honor the user's two highest-ranked criteria). If the data storage rate were high enough that two of the adjustments were necessary to meet the target, the controller could also reduce the number of pictures per trigger while keeping the high sensitivity (essentially honoring only the user's highest-ranked criteria). If instead the user had ranked resolution highest, pictures per trigger second, and number of triggers third, the controller could only adjust the motion sensor sensitivity if this is calculated to be sufficient to meet the target, adjust both the motion sensor sensitivity and pictures per trigger if two adjustments are calculated as being necessary to meet the target, or adjust all three if the calculations indicate this will be necessary.

One benefit of the aforementioned strategy is that the calculations/adjustments may be performed periodically and thus the trail camera may continually adjust to changing conditions. For example, if the camera is deployed in July on a trail that sees heavy autumn usage and the user targets a return date of October, the trail camera may begin to see very heavy usage during September. By continually monitoring available storage and the current rate of storage usage, the trail camera can adapt to changing conditions and still be able to use storage effectively. Note that some implementations may compute the rate of storage usage as a moving average window function of the current storage settings, e.g., the average over the past 5 days, 10 days, etc., instead of a total average since deployment. This technique can help the trail camera adapt more quickly to changing conditions. Further implementations may use smoothing or other statistical techniques to throw out outliers (e.g., a day with an exceptionally high number of triggers).

Note that further implementations may selectively delete certain images to conserve storage space. For example, the user may configure the trail camera to delete non-qualifying pictures either immediately or upon reaching a certain storage consumption threshold (e.g., 75%). In further implementations, a classifier may rank each individual image relative to one another based on likelihood that the image has an animal of interest, and a threshold percentage of these images may be automatically deleted while the trail camera is deployed (e.g., bottom 10%). Note that some classifiers (e.g., neural networks) can be used to score individual images instead of simply performing binary classification, and these scores can be used for the ranking.

Battery Usage

In an analogous manner to storage, the trail camera may periodically determine how much remaining battery power is available, a rate at which the trail camera is using the battery power, and then adjust settings to target using most of the remaining battery, but not all, prior to the return date. For example, suppose a trail camera is deployed and the user indicates an intention to return in 100 days. Now, in the first 10 days, suppose the trail camera is in picture/triggering mode with 6 pictures per trigger, high motion sensor sensitivity, and high flash intensity. Further assume that after 10 days 20% of available battery have been used. At this rate, the trail camera will use up all of the storage after only 50 days. Thus, the trail camera may make some adjustments that tend to cause the camera to use less battery power on average. For example, the trail camera may (1) reduce the number of pictures taken per trigger, (2) reduce the flash intensity, (3) reduce the motion sensor sensitivity to cause fewer pictures to be taken, and/or (4) in cases where the camera has multiple view angles, reduce the number of view angles being used to take pictures.

Alternatively, the controller can take opposite steps if the trail camera is using battery capacity more slowly (e.g., 5% after first 10 days) by (1) increasing pictures per trigger, (2) increasing flash intensity, (3) increasing motion sensor sensitivity, and/or (4) increasing the number of view angles used.

The previous examples are also applicable to video mode, e.g., adjustments to increase/decrease video resolution or length can be applied to target optimal usage of battery relative to a preconfigured return date just as discussed above with respect to pictures. Additionally, in time lapse mode, time lapse intervals may be determined as a function of the return date, e.g., determining an interval between time lapse intervals that results in using most of the battery capacity prior to the return date without using all of the battery capacity too soon in advance of the return date. Some implementations may also switch from time lapse to triggering mode at some point to reduce the rate of battery usage.

Some implementations may periodically check the current battery capacity usage and adjust any of the aforementioned settings to adjust the rate of battery usage. For example, each time the camera is triggered, the camera may evaluate the current rate of battery relative to some fixed target (e.g., target using 90% of battery by the return date to provide a 10% buffer). Alternative implementations may calculate the rate of battery usage and perform the aforementioned adjustments less often, e.g., once per day, once per week, etc.

Note also that some implementations may quantify the amount of battery usage as a function of the aforementioned settings to estimate the battery usage rate for a given group of settings. For example, suppose (1) the trail camera, on average uses twice as much battery power on high sensitivity motion sensor settings than on low motion sensor sensitivity settings, (2) taking 3 pictures per trigger uses 50% as much battery as six pictures per trigger, and (3) a low flash intensity setting uses 50% as much battery per picture as a high flash intensity. Further, suppose the trail camera has been using 2% of the battery power per day when deployed at high sensitivity, six pictures per trigger, and high flash intensity. The trail camera can expect to use approximately 1% of the available battery power per day (half the storage usage rate) by doing any one of the following: (1) switching from high to low sensitivity, (2) switching from 6 to 3 pictures per trigger, or (3) switching from high to low flash intensity. Any two of the aforementioned changes should result in even lower (e.g., 0.5% of the available battery per day) usage, and all three should result in using approximately 0.25% of battery power per day.

As a different numerical example, assume the trail camera has been deployed for 50 days at high sensitivity, 6 pictures per trigger, and high flash intensity. Now, assume the trail camera has used 75% of available batter power, e.g., 1.5% per day. Now, there is 25% remaining and 50 more days of expected deployment. Leaving a 10% buffer, the trail camera can target using 15% more battery power in the remaining 50 days, e.g., a target usage rate of 0.3% per day. In this case, all three adjustments may be necessary to adjust the storage usage rate enough to meet the 0.3% target usage rate.

Assume instead the trail camera has only been deployed for 10 days before the calculations/adjustment(s) are performed, and has used 15% of the battery capacity in first 10 days, i.e., 1.5% per day. Now, given 90 days of remaining expected deployment and 75% remaining usable battery (leaving 10% buffer), it may not be necessary to make all of the aforementioned adjustments. Rather, any one of the aforementioned adjustments should result in using only 0.75% of the batter power per day, using an expected 67.5% more of remaining battery power in those 90 days, which is sufficient to meet the 10% target remaining battery power left at the 100 day mark. In this case, the trail camera may only need to perform only one of the aforementioned adjustments.

In some cases, users may be able to prioritize or rank various criteria that are used by the controller to perform the aforementioned adjustments. For example, suppose the user ranks getting many triggers first (e.g., sensitivity), getting many pictures per trigger second, and flash intensity third. In this case, at the 10 day mark in the previous example, the controller can simply use the lowest-ranked criteria to adjust the camera, e.g., lower the flash intensity only while retaining high sensitivity and six pictures per trigger (honor the user's two highest-ranked criteria). If the battery usage rate were high enough that two of the adjustments were necessary to meet the target, the controller could also reduce the number of pictures per trigger while keeping the high sensitivity (essentially honoring only the user's highest-ranked criteria). If instead the user had ranked flash intensity highest, pictures per trigger second, and number of triggers third, the controller could only adjust the motion sensor sensitivity if this is calculated to be sufficient to meet the target, adjust both the motion sensor sensitivity and pictures per trigger if two adjustments are calculated as being necessary to meet the target, or adjust all three if the calculations indicate this will be necessary.

One benefit of the aforementioned strategy is that the calculations/adjustments may be performed periodically and thus the trail camera may continually adjust to changing conditions. For example, if the camera is deployed in July on a trail that sees heavy autumn usage and the user targets a return date of October, the trail camera may begin to see very heavy usage during September. By continually monitoring available battery and the current rate of battery usage, the trail camera can adapt to changing conditions and still be able to use storage effectively. Note that some implementations may compute the rate of battery usage as a moving average window function of the current storage settings, e.g., the average over the past 5 days, 10 days, etc., instead of a total average since deployment. This technique can help the trail camera adapt more quickly to changing conditions. Further implementations may use smoothing or other statistical techniques to throw out outliers (e.g., a day with an exceptionally high number of triggers).

Note also that the aforementioned numerical examples are provided for the sake of illustration. Further examples may model the battery and/or storage usage rates as a function of various settings using any number of methods. For example, some implementations may model each individual setting as a separate independent variable under various conditions (e.g., using a regression model) to determine the impact of that setting on battery and/or storage usage rate.

Also note that the aforementioned examples for both battery and storage usage can be coupled with the previously-mentioned techniques of making certain adjustments based on ambient light, time of day, weather, historical/current activity, etc. As an example, consider a situation where the camera is using ambient light to switch between time lapse mode during the day and triggering mode at night. In this case, adjustments made during the day can differ from those at night, e.g., adjusting time lapse intervals during the day (increasing if using battery/storage too quickly, decreasing if using battery/storage too slowly) and motion sensor sensitivity at night. Various other combinations are possible, e.g., the camera can be deployed in video mode initially and if storage constraints are problematic switch to picture mode. Alternatively, if battery constraints are problematic but there is plenty of storage, it may make sense to continue with video during the day and switch to pictures at night to save battery caused by long flash activations for video.

As another example, some implementations may try adjusting motion sensor sensitivity only during periods of high wind (as determined using ambient noise, weather server, or other methods) to reduce battery and/or storage rate. In other words, the camera may be deployed at high motion sensor sensitivity and if 50% of the triggers are taken during high wind conditions then the motion sensor sensitivity can be reduced to low sensitivity only during high wind conditions. This may reduce the total number of average triggers per day by, say, 25% and may be sufficient to meet battery/storage targets without adjusting the motion sensor sensitivity at other times of day. On the other hand, if battery/storage usage is extrapolated to be sufficient to meet the user's targeted return date, the motion sensor sensitivity may be left at a high setting even when a bulk of the triggers are happening during windy conditions.

As another example, the user may specify certain times of day when user-defined settings are used regardless of data usage/battery rates. For example, the user may specify numerical clock times near dawn/dusk (or windows of time near sunrise/sunset) and indicate that during these times the camera should not automatically adjust any settings. In this case, the camera might reduce motion sensor sensitivity, flash intensity, resolution, pictures per trigger, etc. on an as-needed bases to meet a targeted return date at other times of day, but use the user-specified settings during the specified times of day.

In addition, as noted, certain times of day may tend to yield more interesting (e.g., qualifying and/or highly-ranked by a classifier) pictures. These times of day can similarly be shielded from any adjustments, e.g., if 80% of pictures taken between 6 and 7 AM are qualifying and only 40% of pictures taken at other times are qualifying, the controller may make the aforementioned motion sensor, flash intensity, resolution, pictures per trigger, etc. changes only during other times of day and may use a preferred (e.g., high sensitivity, high resolution, 6 pictures per trigger, high flash intensity) setting during the specific times when the most qualifying pictures are taken. Similar techniques can be used in the immediate window after a qualifying picture is taken, e.g., these times may be shielded from adjustments to preserve battery and/or storage.

Targeting Battery and Storage Together

Further implementations may target concurrent utilization of storage and battery resources. The general idea here is this—suppose the camera is deployed at a low flash intensity setting to preserve battery power. When the camera is retrieved, all of the available storage is used up, there is 50% remaining battery power, and many of the pictures may not have any visible animals (or poorly visible) due to the low flash setting. In this case, it may have made more sense to use higher intensity flash because there was plenty of battery power to use, in other words the storage resource ran out before the battery resource. For example, a storage capacity expiration date can be determined based on a current storage usage rate. This storage capacity expiration date can be used in a manner such as that discussed above with respect to the designated return date. In other words, the aforementioned techniques for targeting battery usage to a particular return date can be used instead to target the storage capacity expiration date.

As another example, assume the camera is deployed at a low resolution setting and, when it is retrieved, 100% of the battery has been used and only 50% of the storage. In this case, it may have made more sense to use a higher resolution setting since resolution may generally have relatively little impact on battery usage and a much higher impact on storage utilization. In other words, had higher resolution been used, the user could have picked up the camera with about the same number of pictures, very little battery power and very little storage capacity remaining. This may be perceived by the user as a more optimal usage of storage and battery resources since the primary constraint in this case is the retrieval time instead of, e.g., economic considerations such the cost of batteries. In some implementations, a battery capacity expiration date can be determined based on a current battery usage rate. This battery capacity expiration date can be used in a manner such as that discussed above with respect to the designated return date. In other words, the aforementioned techniques for targeting storage usage to a particular return date can be used instead to target the battery capacity expiration date.

In further implementations, the user may specify specific settings to retain and allow the controller to adaptively adjust other settings. For example, the user may select to always use high sensitivity on the motion sensor and allow the controller to adjust other settings for the purposes of conserving battery power/storage. This can be true for the entire deployment or the user may specify particular times of day, e.g., always use high motion sensor sensitivity and high resolution at certain hours of the day and allow the controller to only adjust other settings at this time of day, while allowing the controller to adjust the motion sensor sensitivity and resolution as well at other times of day. This is the case whether targeting using storage and battery resources up together or targeting a particular return date.

On/Off Adjustments

The previous discussion focused largely on adjusting various camera settings of a deployed trail camera. This can include adjusting individual camera settings to turn off certain features, e.g., turning off the flash completely, turning off the motion sensor completely and staying in time lapse mode only, or turning off the camera entirely for periods of time (e.g., a sleep mode). Thus, in some cases, adjusting camera settings can include putting the camera to sleep, which essentially sets all settings "off" for a period of time until the camera awakens.

Ambient Light

In some cases, the trail camera can be configured to turn off certain features completely during certain ambient light conditions. For example, once a given battery power threshold is reached (e.g., 15% remaining battery capacity), the trail camera may turn off the flash entirely. The motion sensor may be turned on only during periods of sufficient light to take quality pictures without the flash. Alternatively, the trail camera can go to sleep for a specified period of time (e.g., 8 hours) when ambient light falls below a specified threshold, and then the trail camera can awake every 30 minutes and poll ambient light levels. Once the polling reveals ambient light levels above the specified threshold, the trail camera can awake and begin taking pictures.

Manually Based on Time of Day

As another example, the user may specify certain criteria, e.g., if storage and/or battery falls below 50%, then have the camera sleep during particular times of day. For example, the user may want to have the camera active at all times when first deployed, then only have the camera active between 6 and 7 AM and 6 and 7 PM once either battery or storage falls to 50% capacity. Further implementations may use multiple thresholds, e.g., camera always on while battery, storage, or both are above 75%, camera on only during daylight hours while battery, storage, or both are above 25% and below 75%, and camera only on at dawn and dusk when battery, storage, or both are below 25%.

Wind Detection Via Ambient Noise

Some implementations may also completely stop taking pictures in the presence of excessive wind or other weather conditions. For example, some implementations may employ a microphone to monitor ambient noise and put the camera to sleep for a period of time (e.g., one hour) based on the ambient noise. Often, wind results in relatively sustained higher levels of sound, whereas animal sounds tend to occur in the vicinity of the camera for only short periods of time. Thus, when sounds captured by the microphone suggest that it is particularly windy, the controller may transition the camera to sleep for an hour. Again, some implementations may require a certain duration of increased noise volume (or a moving average volume over a certain amount of time exceeding a threshold). This may avoid putting the camera to sleep due to noises made by an animal moving in the vicinity of the trail camera.

As noted above, volume is but one characteristic of sound that can be used to determine whether wind is responsible for ambient noise. Further implementations may use sound feature vectors and train a classifier (e.g., a neural network, support vector machine, nearest neighbor, etc.) to discern ambient wind noise vs. animal sounds. For example, labeled training examples of animal sounds and wind taken with the camera microphone can be used to extract sound feature vectors and train the classifier. The trained classifier can be uploaded to the trail camera and used by the classifier to determine when given sounds are likely due to wind or, alternatively, likely due to animals (e.g., sounds of animals moving near the camera). When the classifier indicates that a sound received at the camera is likely due to wind, the controller may put the camera to sleep for a period of time (e.g., one hour, or until the ambient sound no longer is classified as likely due to wind). When the classifier indicates that sound received at the camera is likely due an animal, the controller may stay on. Note that the camera can periodically wake up to check the ambient noise and determine whether to stay asleep or begin taking images again.

Weather Server

In other implementations, the trail camera may communicate via wireless (e.g., cellular) with a weather server or other computing device that provides weather conditions for the current location of the camera (e.g., as determined by a GPS device on the camera or a location uploaded from a smartphone to the camera). The controller may use the current weather conditions to determine whether to put the camera to sleep, e.g., if the current conditions are relatively windy. For example, a wind velocity threshold may be employed (e.g., mph, either gusts or sustained) and velocities above the threshold cause the camera to go to sleep. Similarly, other weather conditions can be mapped to putting the camera to sleep for a period of time, e.g., sleep during thunderstorms, snow showers, etc.

As suggested above, these adjustments can also be performed responsive to observed values of local temperature/barometric pressure/humidity using instruments on the trail camera itself or received weather data. For example, the user can define a particular temperature below (or above) which the camera should sleep. Alternatively, specific humidity and/or barometric pressure ranges can be defined for sleeping. Further, some implementations may use a combination of the instrument values, e.g., if temperature is above 40 degrees Fahrenheit, barometric pressure is falling faster than a predetermined rate, and humidity is at least 50%, then sleep.

Also note that the aforementioned examples may only occur when battery and/or storage are below a certain threshold. For example, the camera may never sleep when battery and storage are both above 50%. If either falls below 50%, then any of the aforementioned weather conditions or noise may cause the camera to fall asleep for a given amount of time. The sleep time can be lengthened as battery/storage fall further, e.g., two hours once battery and/or storage are below 25%.

Historical Activity—Temporary Sleep

Other implementations may decide to sleep based on camera activity. For example, the trail camera may initially be deployed and actively working, but, if recent activity has been insufficient, e.g., relatively few (e.g., qualifying) pictures taken in a given amount of time, the controller can automatically switch the trail camera over to sleep (e.g., all day, only during daylight hours, etc.). In some cases, a user may be able to input certain criteria, e.g., 10 days and 100 pictures. If 10 days go by with fewer than 100 (e.g., qualifying) pictures taken over the 10 day period, the controller may automatically transition the camera to sleep for a certain period of time (e.g., 5 days).

Historical Activity—Temporary Adjustment During Particular Time Period

When qualifying pictures/video are obtained sufficiently frequently at a given time of day over a period of time but not at other times, the trail camera may perform a temporary adjustment so that the trail camera sleeps at the other times and is only operative during the time of day when the pictures are obtained. For example, suppose a user configures the trail camera to only be awake during a particular time period when two criteria are met: (1) at least two qualifying pictures are taken by the camera within a given half-hour period and (2) for at least 7 straight days. Initially, the camera may be active at all times for 7 straight days. Suppose that between 10 and 10:30 AM and between 4 PM and 4:30 PM the trail camera has taken at least two qualifying pictures every day for the week, and no other time periods meet this criteria. In this case, after the first seven days, the trail camera may automatically transition to be awake at 10 AM every day for ½ hour, and go back to sleep until 4 PM, wake up until 4:30 PM and go back to sleep until 10 AM, etc. Also note that some implementations may only require that a particular number of qualifying pictures are taken over a given amount of time, e.g., 14 qualifying pictures within a week for any ½ hour period may be sufficient to cause the trail camera to not sleep during that time period. In this case, the adjustment may occur even if one day has fewer than 2 qualifying pictures during the time period, so long as the total number of pictures is at least 14.

As another example, some implementations may maintain a moving average of the number of qualifying pictures taken during time periods (e.g., each hour) of the day. The controller may configure the trail camera to only be awake during time periods for which the moving average exceeds a threshold. As an example, if the threshold is 3 qualifying pictures per hour, and the moving average for 3-4 PM is 2.2 qualifying pictures, 3.2 qualifying pictures for 4-5 PM, and 2.8 qualifying pictures from 5-6 PM, then the camera can awake every day at 4 PM and go back to sleep at 5 PM.

Current Activity

Some implementations may evaluate images (or video) just taken for short-term periods of sleep. For example, suppose the camera triggers 15 consecutive times without any qualifying pictures. In this case, the controller may put the camera to sleep for one hour to avoid taking even more empty pictures. Other criteria can be defined, e.g., if less than 10% of the previous 50 pictures are qualifying, go to sleep for an hour, etc.

Frame Rates

The aforementioned implementations may also adaptively control video frame rate as another mechanism for saving storage capacity. For example, some implementations may increase/decrease frame rate for videos taken at different times of day. In some cases, higher frame rates are used when ambient light is relatively high, because typically better image quality can be obtained and thus higher frame rates can allow for smoother depictions of animal motion. Conversely, night time video may contain frames that are less precise, relatively, than daytime frames and accordingly some storage capacity can be saved by using lower frame rates at night. Alternatively, some situations may call for using a higher frame rate at night than is used during the day.

Frame rates can also be adjusted at certain times of day or relative to sunrise/sunset, e.g., automatically or based on explicit user inputs selecting specific times to change frame rates. For example, the controller can switch to a higher frame rate at particular times of day, e.g., 5 PM to 6 PM and 7 AM to 8 AM and otherwise transition back to a lower frame rate (or vice versa, lower frame rate at specified times and higher frame rate otherwise). Furthermore, higher (or lower) frame rates can be configured to begin ½ hour before sunrise and end 1 hour after sunrise and similarly relative to sunset.

Wind can also be used as a mechanism for adjusting frame rate, using either the ambient noise classification technique or weather data (e.g., from a server) as discussed above. For example, it may be beneficial to switch to a lower frame rate during relatively windy conditions in order to prevent wasting storage on videos that are relatively more likely to be taken in response to false triggers.

Frame rate can also be adjusted persistently, e.g., transition to a higher frame rate after a certain number of days go by without a total number of triggers (e.g., 10 days, 100 triggers). Similarly, frame rate can be reduced persistently when a total number of triggers occur during a specified time interval. Likewise, frame rate can be adjusted temporarily as discussed above, e.g., based on numbers of qualifying pictures taken between certain times of day. For example, the example above where two qualifying pictures per day for 7 straight days between 10 and 10:30 AM is also applicable to frame rate, e.g., frame rate can be increased at this time to capture higher quality video during times of day when it is especially likely that animals will be moving in the videos. As also discussed above, some implementations may not require a certain number of qualifying images per day (e.g., 14 qualifying images over 7 days) may be sufficient to transition to a higher frame rate at certain times of day even if there were days when 2 qualifying images were not obtained during those times. As a further note, in the case of video, some implementations may consider an entire video as a single "qualifying image" for the purposes of the above discussion, e.g., if any frame in the video qualifies than the video as a whole can qualify. This can be preferable to counting every single frame of a video as qualifying/non-qualifying. Also, note that some implementations may perform frame rate adjustments based on current activity, e.g., if a qualifying video or picture is taken the frame rate may be increased for the next five minutes.

Also, note that frame rate can be adjusted in conjunction with other settings as discussed above in the "General Combinations" section. For example, frame rate can be reduced while at the same time reducing the length of video taken per trigger (or per time lapse interval) and/or reducing resolution to further reduce the storage impact of video. Other examples can adjust motion sensor sensitivity along with frame rate, e.g., during particular times of day, responsive to particular weather patterns (e.g., wind) and/or based on camera activity (e.g., increase both frame rate and motion sensor sensitivity during times of day that tend to produce relatively more qualifying images).

The techniques discussed above in the section "Storage Constraints" are also applicable to frame rate adjustments. Generally, the impact of frame rate on storage size of video files can be determined and then the frame rate can be adjusted to target a particular return time and/or to target full storage utilization and full battery utilization together. Again, frame rate can be adjusted along with video length and/or resolution when performing the aforementioned techniques. For example, in triggering mode, video resolution, motion sensor sensitivity, frame rate, and video length can all be adjusted to target using storage effectively to meet a given return date or to utilize all storage at approximately the same time as battery power expires. As also noted above, these calculations can be performed periodically during the deployment period of the trail camera.

In further implementations, the functionality discussed above can be offloaded to a separate device. In the case where the trail camera has wireless connectivity to the Internet and/or a user's other devices, a server, laptop, or other device can perform the above logic and send wireless instructions to the trail camera to adjust the aforementioned settings. For example, one specific implementation involves the trail camera wirelessly sending pictures and video to a computing device that performs the aforementioned techniques and instructs the trail camera to adjust various settings. In some cases, the trail camera may also send other information, such as location data, remaining battery power, ambient noise/wind, remaining storage capacity, etc., as needed to the computing device. In further implementations, the trail camera may label each image/video with the particular settings that were in place when the image/video was taken and send this information to the computing device as well to facilitate the aforementioned processing.

Furthermore, note that the functionality discussed above for the server may be performed by another device, e.g., instead of an Internet-connected server, a wireless control unit may be deployed with one or more trail cameras. Generally, the wireless control unit may be within wireless range (e.g., 3/4G and/or 802.11) of multiple trail cameras and may perform such processing as discussed above. In some cases, the trail cameras may even delete their pictures/video as storage constraints are met and the wireless control unit can be used for picture/video storage. In these implementations, the aforementioned techniques for targeted usage of storage capacity can be applied using the remaining storage capacity of the wireless control unit instead of the storage capacity of the individual trail cameras. This is also true for battery power, e.g., the wireless control unit can adjust settings based on its own remaining battery power alternatively to, or in addition to, doing so based on remaining battery power for the individual cameras. The wireless control unit may also be a weatherproof, battery powered unit and in some cases may have mounting capabilities (e.g., straps for mounting to a tree), a tripod or other leg-stand arrangement, or even be suited for burial with only a wireless antenna extending out of the ground. The wireless control unit, like the trail camera, may have a subdued, matte color (e.g., camo, brown, green, black, etc.) so that the unit is not too obvious when deployed in nature. Also note the wireless control unit may have one or more processors and one or more computer-readable storage/memory devices with instructions that cause the wireless control unit to perform the above-mentioned processing. Also, note that the wireless control unit can, in some cases, be embodied as a trail camera, e.g., a "master" trail camera with one or more "slaves" having settings controlled by the master.

Some implementations may also involve the wireless control unit or computing device communicating directly with remote sensors. For example, some implementations may use separate motion sensors that wirelessly (or wired) trigger a given trail camera to take a picture/video. In these cases, the wireless control unit/computing device may be in wireless communication with the remote motion sensors and control sensitivity settings on the motion sensors. This is also true for remote flash devices, IR and/or visible spectrum.

The invention claimed is:

1. A trail camera comprising:
   a lens;
   a motion sensor;
   a flash; and
   a controller configured to:
      operate in a triggering mode during a first time period, the trail camera capturing pictures in response to motion sensor triggers by the motion sensor in the triggering mode;
      after the first time period and in the absence of current user input, automatically transition from the triggering mode to a concurrent time lapse and triggering mode for a second time period, wherein, in the concurrent time lapse and triggering mode, the trail camera captures pictures at regular intervals in the absence of motion sensor triggers and also captures pictures in response to motion sensor triggers by the motion sensor; and
      after the second time period, automatically transition back to the triggering mode for a third time period.

2. The trail camera of claim 1, wherein the controller is configured to determine when to operate in the triggering mode and when to operate in the concurrent time lapse and triggering mode based on the time of day.

3. The trail camera of claim 2, wherein the controller is configured to adaptively change times of day when the triggering mode is active and when the concurrent time lapse and triggering mode is active based on changing sunrise times by date.

4. The trail camera of claim 3, wherein the controller is configured to adaptively change times of day when the triggering mode is active and when the concurrent time lapse and triggering mode is active based on changing sunset times by date.

5. The trail camera of claim 4, wherein the controller is configured to activate the concurrent time lapse and triggering mode during specified time windows that include sunrise and sunset, and activate the triggering mode outside of the specified time windows.

6. The trail camera of claim 5, wherein the controller is configured to receive user input indicating when the specified time windows occur relative to sunrise and sunset.

7. The trail camera of claim 1, further comprising a light sensor, wherein the controller is configured to determine when to operate in the triggering mode and when to operate in the concurrent time lapse and triggering mode based on ambient light detected by the light sensor.

8. The trail camera of claim 7, wherein the controller is configured to operate the trail camera in the concurrent time lapse and triggering mode when the ambient light is relatively bright and to automatically transition to the triggering mode when ambient light is relatively dark.

9. A trail camera comprising:
   a lens;
   a flash;
   a motion sensor; and
   a controller configured to:
      operate in a picture mode during a first time period, the trail camera capturing pictures at regular intervals or in response to motion sensor triggers in the picture mode;
      after the first time period, in the absence of current user input, and based on a time of day determined by the trail camera or ambient noise detected by the trail camera, automatically transition from the picture mode to a video mode for a second time period, the trail camera capturing video at regular intervals or in response to motion sensor triggers in the video mode; and
      after the second time period, automatically transition from the video mode to the picture mode for a third time period.

10. The trail camera of claim 9, further comprising:
    a microphone configured to detect the ambient noise,
    wherein the controller is configured to:
       transition to the video mode during periods of low ambient noise and transition to the picture mode during periods of high ambient noise.

11. The trail camera of claim 9, wherein the controller is configured to determine when to operate in the picture mode and when to operate in the trail camera in the video mode based on the time of day.

12. The trail camera of claim 11, wherein the controller is configured to adaptively change times of day when the picture mode is active and when the video mode is active based on changing sunrise times by date.

13. The trail camera of claim 12, wherein the controller is configured to adaptively change times of day when the picture mode is active and when the video mode is active based on changing sunset times by date.

14. The trail camera of claim 13, wherein the controller is configured to adaptively change times of day when the picture mode is active and when the video mode is active based on user-specified windows relative to sunrise and sunset.

15. A trail camera comprising:
a lens;
a flash;
a motion sensor; and
a controller configured to:
  after being deployed and in the absence of current user input, detect an animal in an image taken by the trail camera and perform at least one of:
    transitioning from picture mode to video mode,
    increasing a number of pictures taken per motion sensor trigger, or
    beginning to capture time lapse images at regular time intervals,
  responsive to detecting the animal in the image.

16. The trail camera of claim 15, the controller configured to employ a trained image classifier to detect the animal in the image.

17. The trail camera of claim 15, the controller configured to transition from the picture mode to the video mode for a time period of a specified duration after detecting the animal and transition back to the picture mode after expiration of the time period.

18. The trail camera of claim 15, the controller configured to increase the number of pictures taken per motion sensor trigger for a time period of a specified duration after detecting the animal and reduce the number of pictures taken per motion sensor trigger after expiration of the time period.

19. The trail camera of claim 15, the controller configured to capture the time lapse images for a time period of a specified duration after detecting the animal and cease capturing the time lapse images after expiration of the time period.

20. A trail camera comprising:
a lens;
a motion sensor;
a flash; and
a controller configured to:
  initially upon being deployed, begin operation of the trail camera at a particular motion sensor sensitivity; and
  after being deployed for one or more full days, perform adjustment of the motion sensor sensitivity based at least on triggering activity by the motion sensor during the one or more full days prior to the adjustment.

21. The trail camera of claim 20, wherein the controller is configured to increase the motion sensor sensitivity when fewer than a specified number of pictures are taken by the trail camera during the one or more full days prior to the adjusting.

* * * * *